(12) United States Patent
Morita et al.

(10) Patent No.: US 11,884,782 B2
(45) Date of Patent: Jan. 30, 2024

(54) RESIN PARTICLES, CONDUCTIVE PARTICLES, CONDUCTIVE MATERIAL AND CONNECTION STRUCTURE

(71) Applicant: SEKISUI CHEMICAL CO., LTD., Osaka (JP)

(72) Inventors: Hiroyuki Morita, Osaka (JP); Takeshi Wakiya, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 158 days.

(21) Appl. No.: 17/440,023

(22) PCT Filed: Mar. 18, 2020

(86) PCT No.: PCT/JP2020/011870
§ 371 (c)(1),
(2) Date: Sep. 16, 2021

(87) PCT Pub. No.: WO2020/189697
PCT Pub. Date: Sep. 24, 2020

(65) Prior Publication Data
US 2022/0213279 A1    Jul. 7, 2022

(30) Foreign Application Priority Data

Mar. 19, 2019   (JP) .................................. 2019-050770
Dec. 12, 2019   (JP) .................................. 2019-224683

(51) Int. Cl.
*C08L 101/12*   (2006.01)
*C08J 3/12*     (2006.01)
(Continued)

(52) U.S. Cl.
CPC ................ *C08J 3/12* (2013.01); *C08G 59/50* (2013.01); *C08K 3/08* (2013.01); *C08L 63/00* (2013.01);
(Continued)

(58) Field of Classification Search
CPC ........................... C08L 101/12; C08L 2203/20
See application file for complete search history.

(56) References Cited

U.S. PATENT DOCUMENTS

2009/0020733 A1   1/2009   Hirakawa et al.
2014/0083740 A1   3/2014   Ishizawa et al.
(Continued)

FOREIGN PATENT DOCUMENTS

CN    103443868    12/2013
CN    103732659     4/2014
(Continued)

OTHER PUBLICATIONS

Translation KR 20160140422 A (Year: 2016).*
(Continued)

*Primary Examiner* — Hoa (Holly) Le
(74) *Attorney, Agent, or Firm* — Wenderoth, Lind & Ponack, L.L.P.

(57) ABSTRACT

Provided is a resin particle that can be uniformly brought into contact with an adherend, can effectively enhance adhesion to a conductive portion and impact resistance when electrodes are electrically connected to each other using a conductive particle having the conductive portion formed on a surface thereof, and further can effectively reduce connection resistance. In the resin particle according to the present invention, an exothermic peak is observed when differential scanning calorimetry is performed by heating the resin particle at a temperature rising rate of 5° C./min from 100° C. to 350° C. in an air atmosphere.

11 Claims, 4 Drawing Sheets

(51) Int. Cl.
- *C08G 59/50* (2006.01)
- *C08K 3/08* (2006.01)
- *C08L 63/00* (2006.01)
- *H01B 1/22* (2006.01)
- *H01R 11/01* (2006.01)

(52) U.S. Cl.
CPC .............. *H01B 1/22* (2013.01); *H01R 11/01* (2013.01); *C08K 2003/0862* (2013.01)

(56) References Cited

U.S. PATENT DOCUMENTS

| | | |
|---|---|---|
| 2014/0186536 A1 | 7/2014 | Padilla-Acevedo et al. |
| 2016/0086687 A1 | 3/2016 | Ishizawa et al. |
| 2016/0280953 A1 | 9/2016 | Maehata et al. |
| 2019/0161587 A1* | 5/2019 | Mutsuda ................ C08G 69/08 |

FOREIGN PATENT DOCUMENTS

| | | | |
|---|---|---|---|
| CN | 106189918 | 12/2016 | |
| CN | 109476851 | 3/2019 | |
| CN | 114207025 | 3/2022 | |
| JP | 3-47877 | 2/1991 | |
| JP | 2011-63761 | 3/2011 | |
| JP | 2012-124035 | 6/2012 | |
| JP | 2016-183300 | 10/2016 | |
| JP | 2018-142552 | 9/2018 | |
| JP | 2019019248 | 2/2019 | |
| KR | 20160140422 A | * | 12/2016 |
| WO | 2006/080247 | 8/2006 | |
| WO | 2012/067072 | 5/2012 | |
| WO | 2013/025303 | 2/2013 | |
| WO | 2014/189028 | 11/2014 | |
| WO | 2018/016138 | 1/2018 | |

OTHER PUBLICATIONS

Millot et al., Assessment of polyamide-6 crystallinity by DSC Temperature dependence of the melting enthalpy, J . . . Therm. Anal. Calorim., Apr. 2015 | DOI 10.1007/s10973-015-4670-5 (Year: 2015).*

International Search Report (ISR) dated Jun. 9, 2020 in International (PCT) Application No. PCT/JP2020/011870.

International Preliminary Report on Patentability and Written Opinion of the International Searching Authority dated Sep. 16, 2021 in International (PCT) Application No. PCT/JP2020/011870.

* cited by examiner

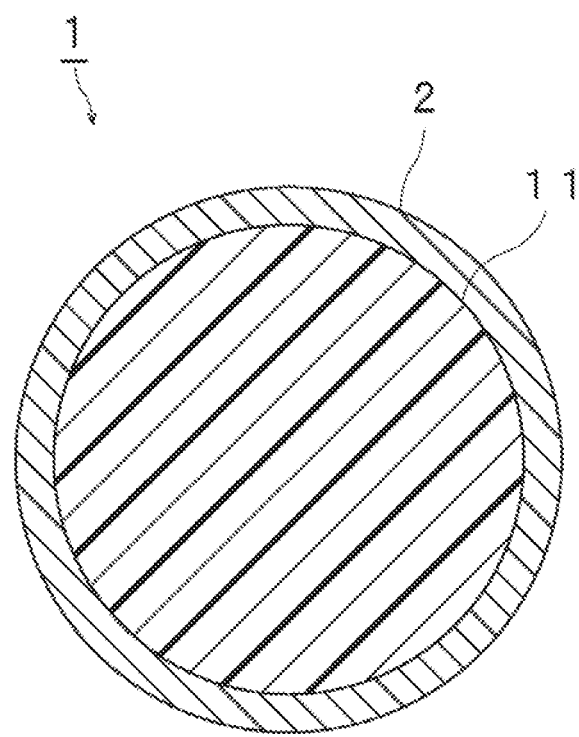
[FIG. 1.]

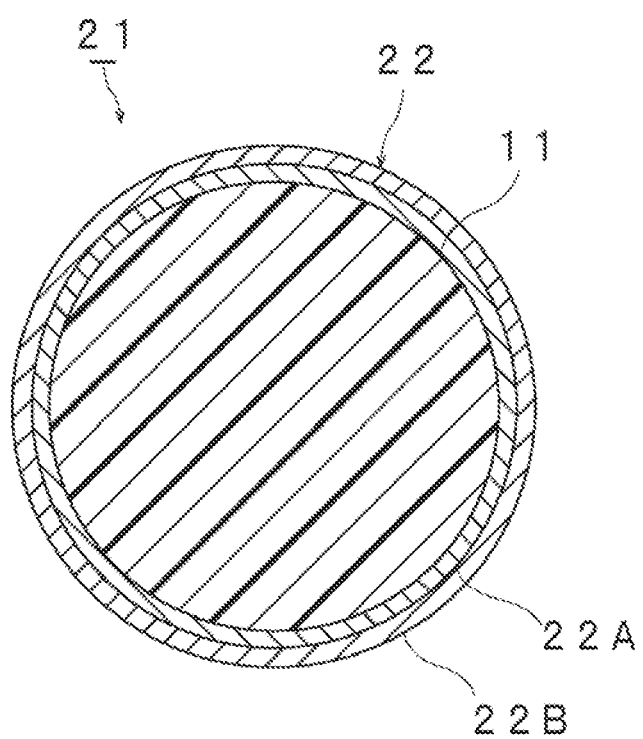
[FIG. 2.]

[FIG. 3.]
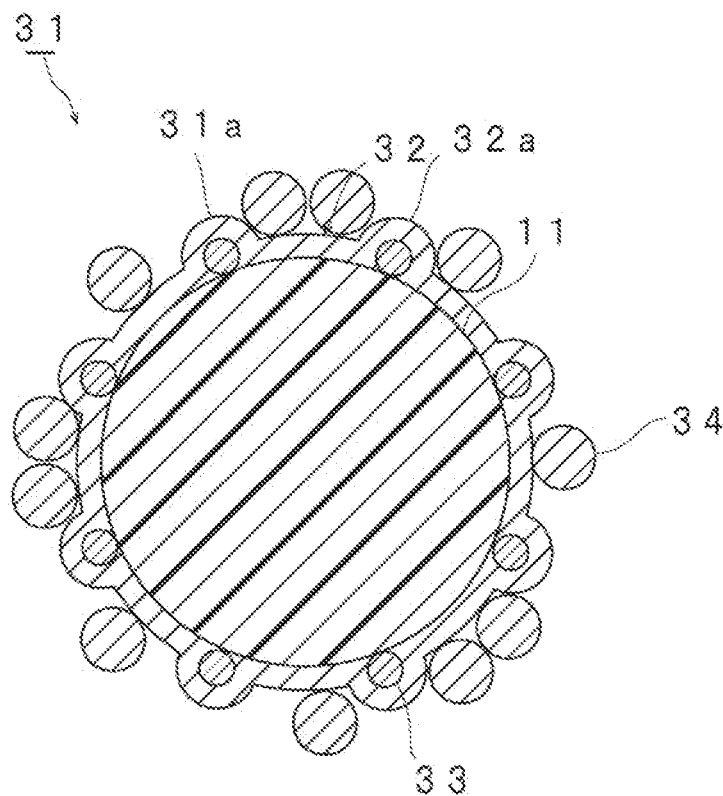
[FIG. 4.]
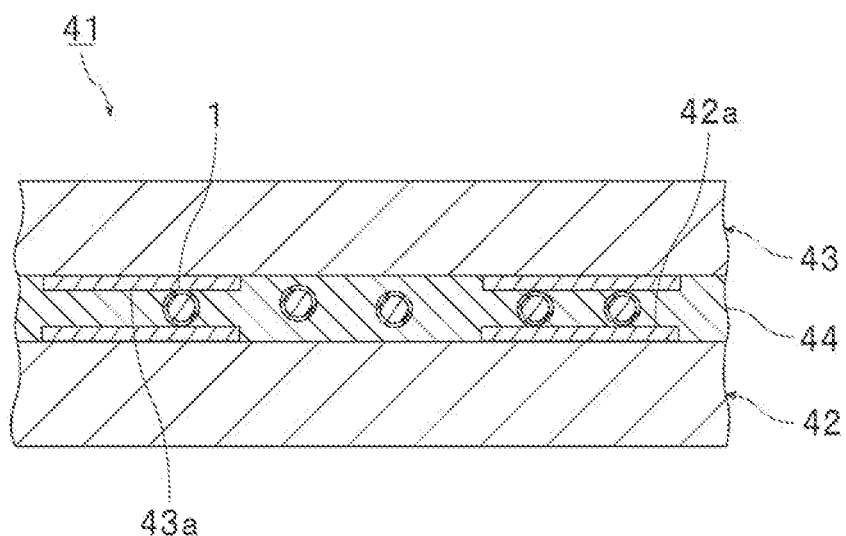

[FIG. 5.]
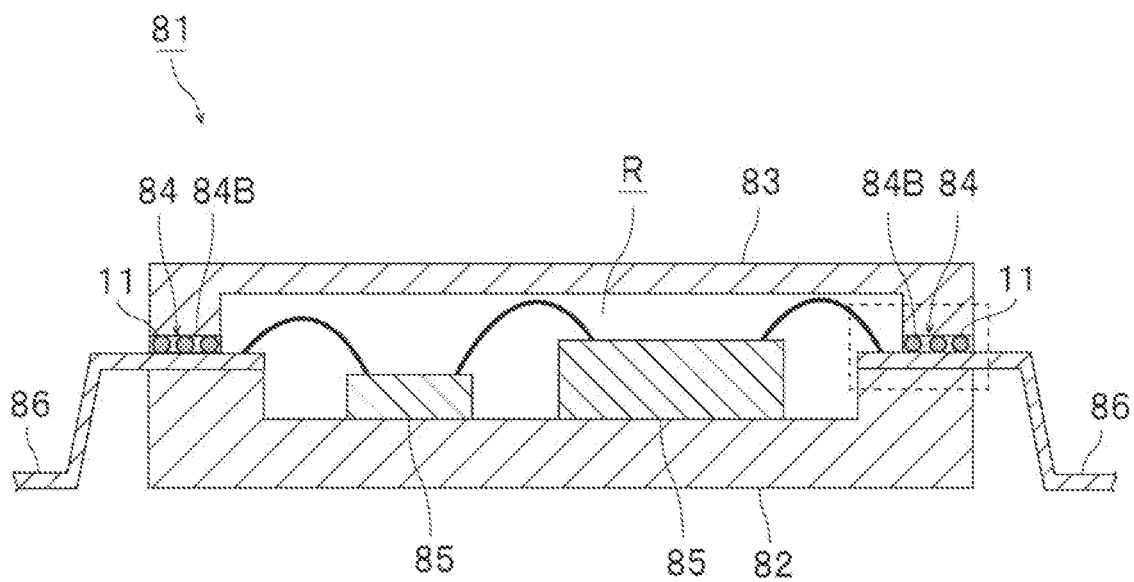
[FIG. 6.]
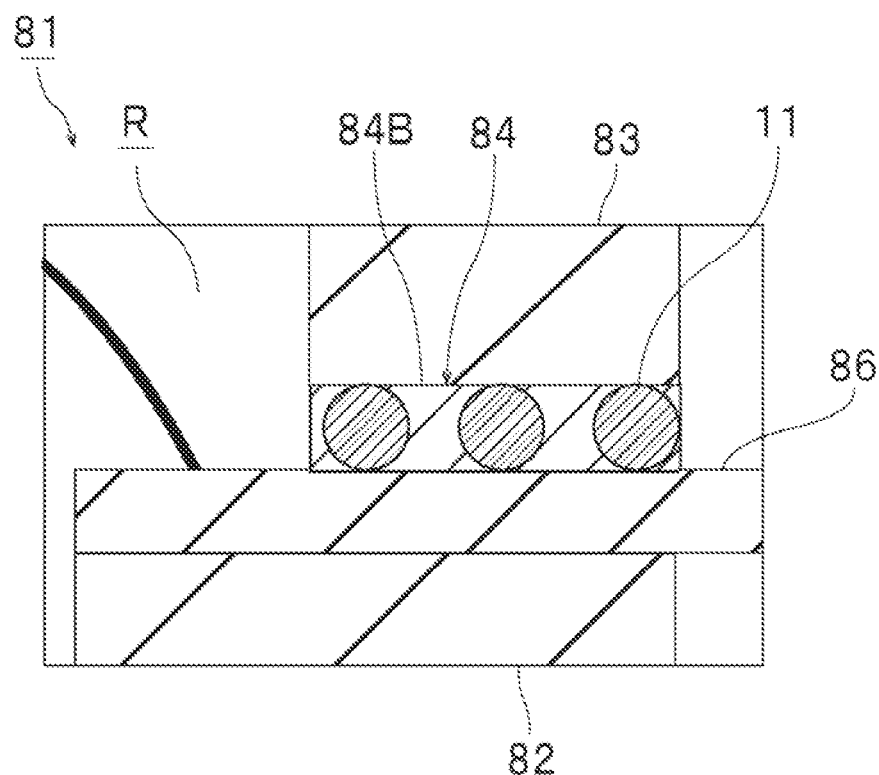

RESIN PARTICLES, CONDUCTIVE PARTICLES, CONDUCTIVE MATERIAL AND CONNECTION STRUCTURE

TECHNICAL FIELD

The present invention relates to a resin particle having good compression characteristics. The present invention also relates to a conductive particle, a conductive material, and a connection structure using the resin particle.

BACKGROUND ART

Anisotropic conductive materials such as anisotropic conductive paste and anisotropic conductive films are widely known. In the anisotropic conductive material, conductive particles are dispersed in a binder resin.

The anisotropic conductive material is used for electrically connecting electrodes of various connection object members such as a flexible printed circuit board (FPC), a glass substrate, a glass epoxy substrate, and a semiconductor chip to obtain a connection structure. As the conductive particle, a conductive particle having a base particle and a conductive layer disposed on a surface of the base particle may be used. A resin particle may be used as the base particle.

Patent Document 1 below discloses a resin particle that is present on a surface of a conductive particle and is configured to insulate the conductive particle. The resin particle contains an acrylic crosslinked polymer obtained by copolymerizing a polymerizable component containing a non-crosslinkable (meth)acrylic acid alkyl ester (A) having an alkyl group having 4 to 18 carbon atoms and a crosslinkable monomer (B) having two or more polymerizable groups in one molecule. In the resin particle, a content of the crosslinkable monomer (B) is 7% by mass or more in the polymerizable component.

Patent Document 2 below discloses a method of producing a thermosetting resin-softened particle. The production method includes a step of reacting a monomer compound containing at least one type of bifunctional monomer with an aldehyde compound under a basic condition in the presence of a suspension of colloidal silica having an average particle diameter of 5 nm to 70 nm to produce an aqueous solution of a precondensate soluble in water, and a step of adding an acid catalyst to the aqueous solution to precipitate spherical thermosetting resin softening particles. In the production method, the bifunctional monomer is a monomer selected from 6-substituted guanamines and ureas.

Various adhesives are used for bonding two connection object members and the like (adherends). In order to make a thickness of an adhesive layer formed by the adhesive uniform and to control an interval (gap) between the two connection object members or the like (adherends), a gap material (spacer) may be blended in the adhesive. A resin particle may be used as the gap material (spacer).

RELATED ART DOCUMENTS

Patent Documents

Patent Document 1: JP 2012-124035 A
Patent Document 2: WO2012/067072A1

SUMMARY OF THE INVENTION

Problems to be Solved by the Invention

In recent years, when electrodes are electrically connected to each other using a conductive material or a connection material containing a conductive particle, it is desired to electrically and reliably connect the electrodes even at a relatively low pressure and reduce connection resistance. For example, in a method of manufacturing a liquid crystal display device, when a flexible substrate is mounted by a FOG (Film on Glass) method, an anisotropic conductive material is disposed on a glass substrate, the flexible substrate is stacked, and thermocompression bonding is performed. In recent years, narrowing of a frame of a liquid crystal panel and thinning of a glass substrate have progressed. In this case, when thermocompression bonding is performed at a high pressure and a high temperature at the time of mounting the flexible substrate, distortion may occur in the flexible substrate, and display unevenness may occur. Therefore, when the flexible substrate is mounted by the FOG method, it is desirable to perform thermocompression bonding at a relatively low pressure. In addition to the FOG method, it may be required to relatively lower the pressure and temperature at the time of thermocompression bonding.

In the case of using a conventional resin particle as a conductive particle, when the electrodes are electrically connected to each other at a relatively low pressure, the connection resistance may increase. The cause of this is that the conductive particle is not sufficiently in contact with the electrode (adherend), or adhesion between the resin particle and a conductive portion disposed on a surface of the resin particle is low, so that the conductive portion is peeled off. In addition, when a connection portion that electrically connects electrodes to each other is formed using a conventional conductive particle, if an impact due to dropping or the like is applied to the connection portion, the connection resistance may increase due to peeling or the like of the conductive portion disposed on the surface of the resin particle.

In the conventional conductive particles, the conductive particle is not sufficiently in contact with the electrode (adherend) due to not only the pressure at the time of connection but also the hardness (material) of the electrode (adherend), and the connection resistance may increase. In addition, scratches may be formed on a surface of the electrode (adherend), and the connection resistance may increase.

When the conventional resin particles are used as a gap material (spacer), a connection object member and the like (adherend) may be damaged. The conventional resin particles are not sufficiently in contact with the connection object member and the like (adherend), and a sufficient gap control effect may not be obtained.

An object of the present invention is to provide a resin particle that can be uniformly brought into contact with an adherend, can effectively enhance adhesion to a conductive portion and impact resistance when electrodes are electrically connected to each other using a conductive particle having the conductive portion formed on a surface thereof, and further can effectively reduce connection resistance. An object of the present invention is to provide a conductive particle, a conductive material, and a connection structure using the resin particle describe above.

Means for Solving the Problems

According to a broad aspect of the present invention, there is provided a resin particle in which an exothermic peak is observed when differential scanning calorimetry is performed by heating the resin particle at a temperature rising rate of 5° C./min from 100° C. to 350° C. in an air atmosphere.

In a specific aspect of the resin particle according to the present invention, among the exothermic peaks, an exothermic amount at the exothermic peak having the largest peak area is 2,000 mJ/mg or more and 25,000 mJ/mg or less.

In a specific aspect of the resin particle according to the present invention, when differential scanning calorimetry is performed by heating the resin particle at a temperature rising rate of 5° C./min from 100° C. to 350° C. in an air atmosphere, an endothermic peak having an endothermic amount of 2,0000 mJ/mg or more is not observed.

In a specific aspect of the resin particle according to the present invention, an absolute value of a difference between a compressive elasticity modulus when the resin particle is compressed by 10% and the compressive elasticity modulus when the resin particle heated at 200° C. for 10 minutes is compressed by 10% is 180 N/mm$^2$ or more.

In a specific aspect of the resin particle according to the present invention, the resin particle is used for a spacer, used for an adhesive for an electronic component, used to obtain a conductive particle having a conductive portion, or used for an additive manufacturing material.

In a specific aspect of the resin particle according to the present invention, the resin particle is used as a spacer or used to obtain a conductive particle having a conductive portion by forming the conductive portion on a surface thereof.

According to a broad aspect of the present invention, there is provided a conductive particle including the resin particle described above and a conductive portion disposed on a surface of the resin particle.

In a specific aspect of the conductive particle according to the present invention, an absolute value of a difference between a compressive elasticity modulus when the conductive particle is compressed by 10% and a compressive elasticity modulus when the conductive particle heated at 200° C. for 10 minutes is compressed by 10% is 180 N/mm$^2$ or more.

In a specific aspect of the conductive particle according to the present invention, the conductive particle further includes an insulating substance disposed on an outer surface of the conductive portion.

In a specific aspect of the conductive particle according to the present invention, the conductive particle has a protrusion on an outer surface of the conductive portion.

According to a broad aspect of the present invention, there is provided a conductive material including conductive particle and a binder resin, in which the conductive particle includes the resin particle described above and a conductive portion disposed on a surface of the resin particle.

According to a broad aspect of the present invention, there is provided a connection structure including a first connection object member having a first electrode on a surface thereof, a second connection object member having a second electrode on a surface thereof, and a connection portion connecting the first connection object member and the second connection object member. In this connection structure, the connection portion is formed of a conductive particle or a conductive material containing the conductive particle and a binder resin, the conductive particle includes the resin particle described above and a conductive portion disposed on a surface of the resin particle, and the first electrode and the second electrode are electrically connected by the conductive particle.

Effect of the Invention

In the resin particle according to the present invention, the exothermic peak is observed when differential scanning calorimetry is performed by heating the resin particle at a temperature rising rate of 5° C./min from 100° C. to 350° C. in an air atmosphere. Since the resin particle according to the present invention is provided with the above-described configuration, the resin particle can be uniformly brought into contact with the adherend, can effectively enhance adhesion to the conductive portion and impact resistance when the electrodes are electrically connected to each other using the conductive particle having the conductive portion formed on a surface thereof, and further can effectively reduce connection resistance.

BRIEF DESCRIPTION OF DRAWINGS

FIG. 1 is a cross-sectional view showing a conductive particle according to a first embodiment of the present invention.

FIG. 2 is a cross-sectional view showing a conductive particle according to a second embodiment of the present invention.

FIG. 3 is a cross-sectional view showing a conductive particle according to a third embodiment of the present invention.

FIG. 4 is a cross-sectional view showing an example of a connection structure using the conductive particle according to the first embodiment of the present invention.

FIG. 5 is a cross-sectional view showing an example of an electronic component device using resin particle according to the present invention.

FIG. 6 is an enlarged cross-sectional view showing a joint region in the electronic component device shown in FIG. 5.

MODE (S) FOR CARRYING OUT THE INVENTION

Hereinafter, the details of the present invention will be described.

(Resin Particle)

In a resin particle according to the present invention, an exothermic peak is observed when differential scanning calorimetry is performed by heating the resin particle at a temperature rising rate of 5° C./min from 100° C. to 350° C. in an air atmosphere.

Since the resin particle according to the present invention is provided with the above-described configuration, the resin particle can be uniformly brought into contact with the adherend, can effectively enhance adhesion to the conductive portion and impact resistance when the electrodes are electrically connected to each other using the conductive particle having the conductive portion formed on a surface thereof, and further can effectively reduce connection resistance.

In the resin particle according to the present invention, since the exothermic peak is observed by differential scanning calorimetry, the resin particle can be thermally cured by heating. Since the resin particle (resin particle before thermal curing) according to the present invention are not completely thermally cured, the resin particle is easily deformed at a relatively low pressure and temperature. For this reason, when the electrodes are electrically connected to each other using the conductive particle in which the conductive portion is formed on the surface of the resin particle, the conductive particle can be sufficiently brought into contact with the electrode even if the pressure and temperature at the time of thermocompression bonding are relatively low, and further, it is possible to prevent formation of a scratch on the electrode. In a case of forming a connection portion that electrically connects the electrodes to each other using conductive particle in which the conductive portion is formed on the surface of the resin particle according to the present invention, the resin particle can be thermally cured in a compressed state at the time of thermocompression bonding. Since a compressed shape is maintained in the conductive particle in the connection portion, peeling of the conductive portion can be effectively prevented, and adhesion between the resin particle and the conductive portion can be effectively enhanced. In addition, even when an impact due to falling or the like is applied to the connection portion, peeling of the conductive portion is effectively prevented, and the connection resistance between the electrodes can be effectively reduced. In the conductive particle using the resin particle according to the present invention, impact resistance can be effectively enhanced. Furthermore, in the conductive particle using the resin particle according to the present invention, the connection resistance between the electrodes can be effectively reduced, and connection reliability between the electrodes can be effectively enhanced. For example, even when a connection structure in which the electrodes are electrically connected to each other by the conductive particle using the resin particle according to the present invention is left for a long time under high temperature and high humidity conditions, the connection resistance is further less likely to increase, and conduction failure is further less likely to occur.

When the resin particle according to the present invention are used as a gap material (spacer), it is possible to effectively suppress scratching of a connection object member and the like. In addition, sufficient contact with the connection object member and the like can be achieved, and a sufficient gap control effect can be obtained.

In the resin particle according to the present invention, the exothermic peak is observed when differential scanning calorimetry is performed by heating the resin particle at a temperature rising rate of 5° C./min from 100° C. to 350° C. in an air atmosphere. In the present specification, the exothermic peak means a peak having an exothermic amount of 1,000 mJ/mg or more. In the differential scanning calorimetry, 10 mg of the resin particles is preferably heated from 100° C. to 350° C. at a temperature rising rate of 5° C./min in an air atmosphere.

When the resin particle satisfy the preferable aspect described above, the resin particle can be more uniformly brought into contact with the adherend. Furthermore, when the resin particle satisfies the preferable aspect described above, in a case where the electrodes are electrically connected to each other using the conductive particle having the conductive portion formed on a surface thereof, the adhesion to the conductive portion and the impact resistance can be more effectively enhanced, and, in addition, the connection resistance can be more effectively reduced. In general, a curing reaction of a thermosetting resin or the like is an exothermic reaction, and is observed as an exothermic peak in differential scanning calorimetry. The resin particle is preferably thermally cured by heating.

In the differential scanning calorimetry, only one exothermic peak may be observed, or two or more exothermic peaks may be observed. Among the exothermic peaks observed in the differential scanning calorimetry, the exothermic amount at the exothermic peak having the largest peak area is preferably 2,000 mJ/mg or more, more preferably 10,000 mJ/mg or more, and preferably 25,000 mJ/mg or less, more preferably 22,000 mJ/mg or less. When the exothermic amount at the exothermic peak having the largest peak area is the above lower limit or more and the above upper limit or less, the resin particle can be more uniformly brought into contact with the adherend. When the exothermic amount at the exothermic peak having the largest peak area is the above lower limit or more and the above upper limit or less, in the case where the electrodes are electrically connected to each other using the conductive particle having the conductive portion formed on a surface thereof, the adhesion to the conductive portion and the impact resistance can be more effectively enhanced, and, in addition, the connection resistance can be more effectively reduced.

In the resin particle, it is preferable that, when differential scanning calorimetry is performed by heating the resin particle at a temperature rising rate of 5° C./min from 100° C. to 350° C. in an air atmosphere, the endothermic peak having an endothermic amount of 2,000 mJ/mg or more is not observed. In the present specification, the endothermic peak means a peak having an endothermic amount of 2,000 mJ/mg or more. In the differential scanning calorimetry, 10 mg of the resin particles is preferably heated from 100° C. to 350° C. at a temperature rising rate of 5° C./min in an air atmosphere. When the resin particle satisfy the preferable aspect described above, the resin particle can be more uniformly brought into contact with the adherend. Furthermore, when the resin particle satisfies the preferable aspect described above, in the case where the electrodes are electrically connected to each other using the conductive particle having the conductive portion formed on a surface thereof, the adhesion to the conductive portion and the impact resistance can be more effectively enhanced, and, in addition, the connection resistance can be more effectively reduced. In general, melting of a resin or the like is an endothermic reaction, and is observed as an endothermic peak in differential scanning calorimetry. It is preferable that the resin particle does not cause melting of the resin or the like.

For the differential scanning calorimetry, a differential scanning calorimeter ("DSC 6220" manufactured by Hitachi High-Tech Science Corporation) or the like is used.

A compressive elasticity modulus when the resin particle is compressed by 10% is defined as a 10% K value (A). The compressive elasticity modulus when the resin particle heated at 200° C. for 10 minutes is compressed by 10% is defined as a 10% K value (B). An absolute value of a difference between the 10% K value (A) and the 10% K value (B) is preferably 180 N/mm$^2$ or more, more preferably 500 N/mm$^2$ or more, still more preferably 800 N/mm$^2$ or more, and particularly preferably 1,000 N/mm$^2$ or more. The absolute value of the difference between the 10% K value (A) and the 10% K value (B) is preferably 10,000 N/mm$^2$ or less, more preferably 7,500 N/mm$^2$ or less, and still more preferably 5,000 N/mm$^2$ or less. When the absolute value of the difference between the 10% K value (A) and the 10% K value (B) is the above lower limit or more and the above upper limit or less, the resin particle can be more uniformly brought into contact with the adherend. When the absolute value of the difference between the 10% K value (A) and the 10% K value (B) is the above lower limit or more and the above upper limit or less, in the case where the electrodes are electrically connected to each other using the conductive particle having the conductive portion formed on a surface thereof, the adhesion to the conductive portion and the impact resistance can be more effectively enhanced, and, in addition, the connection resistance can be more effectively reduced. The absolute value of the difference between the 10% K value (A) and the 10% K value (B) is particularly preferably 200 N/mm$^2$ or more and 3,000 N/mm$^2$ or less. When the absolute value of the difference between the 10%

K value (A) and the 10% K value (B) satisfies the above preferred range, it is possible to more effectively suppress scratching of the adherend by the resin particle, and it is possible to more uniformly bring the resin particle into contact with the adherend. When the absolute value of the difference between the 10% K value (A) and the 10% K value (B) satisfies the above preferred range, in the case where the electrodes are electrically connected to each other using the conductive particle having the conductive portion formed on a surface thereof, the connection resistance can be more effectively reduced, and the connection reliability can be more effectively enhanced.

The 10% K value (A) is preferably 500 N/mm² or more, more preferably 800 N/mm² or more, and preferably 6,000 N/mm² or less, more preferably 4,000 N/mm² or less. When the 10% K value (A) is the above lower limit or more and the above upper limit or less, it is possible to more effectively suppress scratching of the adherend by the resin particle, and it is possible to more uniformly bring the resin particle into contact with the adherend. When the 10% K value (A) is the above lower limit or more and the above upper limit or less, in the case where the electrodes are electrically connected to each other using the conductive particle having the conductive portion formed on a surface thereof, the connection resistance can be more effectively reduced, and the connection reliability can be more effectively enhanced.

The compressive elasticity modulus (10% K value (A) and 10% K value (B)) of the resin particle can be measured as follows.

The resin particle (resin particle (A)) is provided. In addition, the resin particle (resin particle (B)) heated at 200° C. for 10 minutes is provided. Using a micro compression testing machine, a resin particle (A) or (B) is compressed at a smooth indenter end face of a cylinder (diameter of 50 μm, made of diamond) under the conditions of a compression rate of 0.3 mN/sec and a maximum test load of 20 mN at 25° C. The load value (N) and compression displacement (mm) at this time are measured. From the obtained measurement values, the compressive elasticity modulus (10% K value (A) or 10% K value (B)) can be determined by the following equation. As the micro compression testing machine, for example, "Fischer Scope H-100" manufactured by FISCHER INSTRUMENTS K.K., or the like is used. The compressive elasticity modulus (10% K value (A) or 10% K value (B)) in the resin particles (A) or (B) is preferably calculated by arithmetically averaging the compressive elasticity moduli (10% K value (A) or 10% K value (B)) of the 50 resin particles (A) or (B) arbitrarily selected.

$$10\% \text{ K value } (A) \text{ or } 10\% \text{ K value } (B)(\text{N/mm}^2) = (3/2^{1/2}) \cdot F \cdot S^{-3/2} \cdot R^{-1/2}$$

F: load value (N) when the resin particle (A) or (B) is 10% compressed and deformed S: compression displacement (mm) when the resin particle (A) or (B) is 10% compressed and deformed R: radius (mm) of the resin particle (A) or (B)

The compressive elasticity modulus indicates hardness of the resin particle universally and quantitatively. Hardness of the resin particle can be indicated by the compressive elasticity modulus quantitatively and unambiguously.

A compression recovery rate of the resin particles is preferably 5% or more, more preferably 8% or more, and preferably 60% or less, more preferably 40% or less. When the compression recovery rate is the above lower limit or more and the above upper limit or less, it is possible to more effectively suppress scratching of the adherend by the resin particle, and it is possible to more uniformly bring the resin particle into contact with the adherend. When the compression recovery rate is the above lower limit or more and the above upper limit or less, in the case where the electrodes are electrically connected to each other using the conductive particle having the conductive portion formed on a surface thereof, the connection resistance can be more effectively reduced, and the connection reliability can be more effectively enhanced.

The compression recovery rate in the resin particle can be measured as follows.

The resin particles are spread on a sample stage. Using a micro compression testing machine, one of the spread resin particles is subjected to a load (reverse load value) in a center direction of the resin particle at a smooth indenter end face of a cylinder (diameter of 50 μm, made of diamond) at 25° C. until the resin particle is 30% compressed and deformed. After that, unloading is performed up to an origin load value (0.40 mN). The load-compression displacement during this period is measured, and the compression recovery rate can be obtained from the following equation. The loading rate is 0.33 mN/sec. As the micro compression testing machine, for example, "Fischer Scope H-100" manufactured by FISCHER INSTRUMENTS K.K., or the like is used.

$$\text{Compression recovery rate } (\%) = [L2/L1] \times 100$$

L1: Compression displacement from the origin load value to the reverse load value when a load is applied L2: Unloading displacement from the reverse load value to the origin load value when a load is released The use of the resin particle is not particularly limited. The resin particle can be suitably used for various applications. The resin particle is preferably used for a spacer, used for an adhesive for an electronic component, used to obtain the conductive particle having the conductive portion, or used for an additive manufacturing material. The resin particle is more preferably used as a spacer or used to obtain the conductive particle having the conductive portion by forming the conductive portion on a surface thereof. In the conductive particle, the conductive portion is formed on the surface of the resin particle. The resin particle is preferably used to obtain the conductive particle having the conductive portion by forming the conductive portion on the surface. The conductive particle is preferably used for electrically connecting the electrodes to each other. The conductive particle may be used as a gap material (spacer).

The resin particle is preferably used for a gap material (spacer) or used as a gap material (spacer). Examples of the gap material (spacer) include a spacer for a liquid crystal display element, a gap control spacer, a spacer for stress relaxation, and a spacer for a dimming laminate. The gap control spacer can be used for gap control of a laminated chip and an electronic component device for securing a stand-off height and flatness, gap control of an optical component for securing smoothness of a glass surface and a thickness of an adhesive layer, and other gap controls. The spacer for stress relaxation can be used for stress relaxation of a sensor chip or the like, stress relaxation of a connection portion connecting two connection object members, and the like. Examples of the sensor chip include a semiconductor sensor chip. When the resin particle is used as a gap material (spacer), it is possible to effectively suppress scratching of the connection object member and the like. In addition, sufficient contact with the connection object member and the like can be achieved, and a sufficient gap control effect can be obtained.

The resin particle is preferably used for a spacer for a liquid crystal display element or used as the spacer for a liquid crystal display element, and are preferably used for a peripheral sealant for a liquid crystal display element. In the peripheral sealant for a liquid crystal display element, the resin particle preferably functions as a spacer. Since the resin particle has good compressive deformation characteristics and good compressive fracture characteristics, when the resin particle is used as a spacer and arranged between substrates, or when a conductive portion is formed on a surface and used as the conductive particle to electrically connect the electrodes to each other, the spacer or the conductive particle is efficiently arranged between the substrates or between the electrodes. In addition, in the resin particle, since scratching of a member for a liquid crystal display element or the like can be suppressed, connection failure and display failure hardly occur in a liquid crystal display element using the spacer for a liquid crystal display element and a connection structure using the conductive particle.

The resin particle is preferably used in an adhesive for electronic components or used as an adhesive for electronic components. Examples of the adhesive for electronic components include an adhesive for a liquid crystal panel, an adhesive for a laminated substrate, an adhesive for a substrate circuit, and an adhesive for a camera module. Examples of the laminated substrate include a semiconductor sensor chip. The resin particle used for the adhesive for electronic components or the resin particle used as the adhesive for electronic components is preferably an adhesive resin particle having adhesive performance. When the resin particle is an adhesive resin particle, the resin particle and a member to be stacked can be well bonded when the resin particle is cured by pressure bonding. The resin particle can be used alone as an adhesive for electronic components. The resin particle can be used as an adhesive for electronic components without using other adhesive components. When the resin particle is used as the adhesive for electronic components, the resin particle may not be used alone as an adhesive for electronic components, and may be used together with other adhesive components. When the resin particle is an adhesive resin particle having adhesive performance, the resin particle can also be used as a spacer and an adhesive for electronic components. When the resin particle is used as the spacer and the adhesive for electronic components, both physical properties required for the spacer, such as gap controllability and stress relaxation properties, and adhesion can be achieved more highly than when the spacer and the adhesive are made of different materials.

The resin particle is preferably used for an additive manufacturing material. When the resin particle is used for the additive manufacturing material, for example, a three-dimensional formed object can be produced by three-dimensionally stacking the resin particles to form a specific shape and then curing the resin particles.

In addition, the resin particle is also suitably used as an inorganic filler, an additive for toner, an impact absorber, or a vibration absorber. For example, the resin particle can be used as a substitute for rubber, a spring, or the like.

Hereinafter, other details of the resin particle will be described. In the present specification, "(meth)acrylate" means one or both of "acrylate" and "methacrylate", and "(meth)acryl" means one or both of "acryl" and "methacryl".

(Other Details of Resin Particle)

The material of the resin particle is not particularly limited. The material of the resin particle is preferably an organic material. The resin particle may be a particle having a porous structure or a particle having a solid structure. The porous structure means a structure having a plurality of pores. The solid structure means a structure having no plurality of pores.

Examples of the organic material include polyolefin resins such as polyethylene, polypropylene, polystyrene, polyvinyl chloride, polyvinylidene chloride, polyisobutylene, and polybutadiene; acrylic resins such as polymethyl methacrylate and polymethyl acrylate; polycarbonate, polyamide, phenol formaldehyde resin, melamine formaldehyde resin, benzoguanamine formaldehyde resin, urea formaldehyde resin, phenol resin, melamine resin, benzoguanamine resin, urea resin, epoxy resin, urethane resin, isocyanate resin, unsaturated polyester resin, saturated polyester resin, polyethylene terephthalate, polysulfone, polyphenylene oxide, polyacetal, polyimide, polyamideimide, polyether ether ketone, polyether sulfone, divinylbenzene polymer, and divinylbenzene-based copolymer. Examples of the divinylbenzene copolymer include divinylbenzene-styrene copolymer and divinylbenzene-(meth)acrylate copolymer.

The material of the resin particle is preferably an epoxy resin, a melamine resin, a benzoguanamine resin, a urethane resin, an isocyanate resin, a polyimide resin, a polyamide resin, a polyamideimide resin, a phenol resin, or a polymer obtained by polymerizing one or two or more polymerizable monomers having an ethylenically unsaturated group. The material of the resin particle is more preferably an epoxy resin, a melamine resin, a benzoguanamine resin, a polyimide resin, a polyamide resin, a polyamideimide resin, a phenol resin, or a polymer obtained by polymerizing one or two or more polymerizable monomers having an ethylenically unsaturated group. The material of the resin particle is particularly preferably an epoxy resin. When the material of the resin particle satisfies the preferable aspect described above, compression characteristics of the resin particle can be more easily controlled within a suitable range.

When an epoxy resin is used as the material of the resin particle, the epoxy resin is preferably a polyfunctional epoxy resin. Examples of the epoxy resin include bifunctional epoxy resins such as a bisphenol A type epoxy resin and a bisphenol F type epoxy resin, trifunctional epoxy resins such as a triazine type epoxy resin and a glycidylamine type epoxy resin, and tetrafunctional epoxy resins such as a tetrakis phenol ethane type epoxy resin and a glycidylamine type epoxy resin. One kind of the epoxy resin may be used alone, and two or more kinds thereof may be used in combination.

When an epoxy resin is used as the material of the resin particle, it is preferable to use a curing agent together with the epoxy resin. The curing agent thermally cures the epoxy resin. The curing agent is not particularly limited. Examples of the curing agent include an imidazole curing agent, a phenol curing agent, a phenol curing agent, a thiol curing agent such as a polythiol curing agent, and an acid anhydride curing agent. One kind of the thermosetting agents may be used alone, and two or more kinds thereof may be used in combination. From the viewpoint of easily controlling the compression characteristics of the resin particle within a suitable range, the curing agent is preferably an amine curing agent.

The imidazole curing agent is not particularly limited. Examples of the imidazole curing agent include an imidazole compound in which, in 2-methylimidazole, 2-ethyl-4-methylimidazole, 1-cyanoethyl-2-phenylimidazole, 1-cyanoethyl-2-phenylimidazolium trimellitate, 2,4-diamino-6-[2'-methylimidazolyl-(1')]-ethyl-s-triazine and 2,4-diamino-6-[2'-methylimidazolyl-(1')]-ethyl-s-triazineisocyanuric acid adduct, 2-phenyl-4,5-dihydroxymethylimidazole, 2-phenyl-4-methyl-5-hydroxymethylimidazole, 2-phenyl-4-benzyl-5-hydroxymethylimidazole, 2-paratoluyl-4-methyl-5-hydroxymethylimidazole, 2-metatoluyl-4-methyl-5-hydroxymethylimidazole, 2-methatoluyl-4,5-dihydroxymethylimidazole, 2-paratoluyl-4,5-dihydroxymethylimidazole or the like, hydrogen at the 5-position of 1H-imidazole is substituted with a hydroxymethyl group and hydrogen at the 2-position is substituted with a phenyl group or a toluyl group.

The thiol curing agent is not particularly limited. Examples of the thiol curing agent include trimethylolpropane tris-3-mercaptopropionate, pentaerythritol tetrakis-3-mercaptopropionate and dipentaerythritol hexa-3-mercaptopropionate.

The amine curing agent is not particularly limited. Examples of the amine curing agent include ethylenediamine, hexamethylenediamine, octamethylenediamine, decamethylenediamine, 3,9-bis(3-aminopropyl)-2,4,8,10-tetraspiro[5.5]undecane, bis(4-aminocyclohexyl)methane, phenylenediamine, 2,2-bis[4-(4-aminophenoxy)phenyl]propane, meta-phenylenediamine, diaminodiphenylmethane, diaminophenyl ether, meta-xylenediamine, diaminonaphthalene, bisaminomethylcyclohexane, and diaminodiphenyl sulfone. From the viewpoint of easily controlling the compression characteristics of the resin particle within a suitable range, the amine curing agent is preferably a diamine compound. The diamine compound is preferably ethylenediamine, hexamethylenediamine, octamethylenediamine, meta-phenylenediamine, diaminodiphenylsulfone, phenylenediamine, or 2,2-bis[4-(4-aminophenoxy)phenyl]propane. From the viewpoint of easily controlling the compression characteristics of the resin particle within a suitable range, the amine curing agent is more preferably ethylenediamine, diaminodiphenylmethane, phenylenediamine, or 2,2-bis[4-(4-aminophenoxy)phenyl]propane.

The resin particle according to the present invention preferably has a chemical structure derived from a polyfunctional epoxy resin and a chemical structure derived from a diamine compound since it is possible to easily control observation of the exothermic peak when differential scanning calorimetry is performed by heating the resin particle at a temperature rising rate of 5° C./min from 100° C. to 350° C. in an air atmosphere. For the same reason, the resin particle according to the present invention is preferably a particle obtained by reacting a polyfunctional epoxy resin with a diamine compound. By heating the polyfunctional epoxy resin and the diamine compound in a solvent, an epoxy group and an amino group sequentially react with each other, and while a precipitate insolubilized in the solvent is protected by a dispersion stabilizer, particle formation proceeds. By adjusting conditions such as a temperature and a concentration at which the epoxy group and the amino group are reacted in the course of the particle formation, the particle can be formed in a state where the epoxy group and the amino group of a non-reacted portion remain in the particle and on a surface of the particle. When the remaining epoxy group and amino group react with each other by heating, the heat of the reaction is observed as the exothermic peak.

The acid anhydride curing agent is not particularly limited, and any acid anhydride used as a curing agent for thermosetting compounds such as an epoxy compound can be widely used. Examples of the acid anhydride curing agent include bifunctional acid anhydride curing agents such as phthalic anhydride, tetrahydrophthalic anhydride, trialkyltetrahydrophthalic anhydride, hexahydrophthalic anhydride, methylhexahydrophthalic anhydride, methyltetrahydrophthalic anhydride, methylbutenyltetrahydrophthalic anhydride, anhydride of phthalic acid derivative, maleic anhydride, nadic anhydride, methylnadic anhydride, glutaric anhydride, succinic anhydride, glycerin bis trimellitic anhydride monoacetate, and ethylene glycol bis trimellitic anhydride, trifunctional acid anhydride curing agents such as trimellitic anhydride, and tetra- or higher functional acid anhydride curing agents such as pyromellitic anhydride, benzophenone tetracarboxylic anhydride, methylcyclohexene tetracarboxylic anhydride, and polyazelaic acid anhydride.

When the resin particle is obtained by polymerizing a polymerizable monomer having an ethylenically unsaturated group, examples of the polymerizable monomer having an ethylenically unsaturated group include non-crosslinkable monomers and crosslinkable monomers.

Examples of the non-crosslinkable monomers include, as a vinyl compound, styrene monomers such as styrene, α-methyl styrene, and chlorostyrene; a vinyl ether compound such as methyl vinyl ether, ethyl vinyl ether, and propyl vinyl ether; an acid vinyl ester compound such as vinyl acetate, vinyl butylate, vinyl laurate, and vinyl stearate; and a halogen-containing monomer such as vinyl chloride, and vinyl fluoride; as a (meth)acrylic compound, an alkyl (meth)acrylate compound such as methyl (meth)acrylate, ethyl (meth)acrylate, propyl (meth)acrylate, butyl (meth)acrylate, 2-ethylhexyl (meth)acrylate, lauryl (meth)acrylate, cetyl (meth)acrylate, stearyl (meth)acrylate, cyclohexyl (meth)acrylate, and isobornyl (meth)acrylate; an oxygen atom-containing (meth)acrylate compound such as 2-hydroxyethyl (meth)acrylate, glycerol (meth)acrylate, polyoxyethylene (meth)acrylate, and glycidyl (meth)acrylate; a nitrile-containing monomer such as (meth)acrylonitrile; and a halogen-containing (meth)acrylate compound such as trifluoromethyl (meth)acrylate, and pentafluoroethyl (meth)acrylate; as an α-olefin compound, an olefin compound such as diisobutylene, isobutylene, LINEALENE, ethylene, and propylene; and as a conjugated diene compound, isoprene, butadiene, and the like.

Examples of the crosslinkable monomer include, as a vinyl compound, a vinyl-based monomer such as divinylbenzene, 1,4-divinyloxybutane, and divinyl sulfone; as a (meth)acrylic compound, a polyfunctional (meth)acrylate compound such as tetramethylolmethane tetra(meth)acrylate, polytetramethylene glycol diacrylate, tetramethylolmethane tri(meth)acrylate, tetramethylolmethane di(meth)acrylate, trimethylolpropane tri(meth)acrylate, dipentaerythritol hexa(meth)acrylate, dipentaerythritol penta(meth)acrylate, glycerol tri(meth)acrylate, glycerol di(meth)acrylate, polyethylene glycol di(meth)acrylate, polypropylene glycol di(meth)acrylate, polytetramethylene glycol di(meth)acrylate, 1,3-butylene glycol di(meth)acrylate, 1,4-butanediol di(meth)acrylate, 1,6-hexanediol di(meth)acrylate, and 1,9-nonanediol di(meth)acrylate; as an allyl compound, triallyl (iso)cyanurate, triallyl trimellitate, diallyl phthalate, diallyl acrylamide, and diallyl ether; as a silane compound, a silane alkoxide compound such as tetramethoxysilane, tetraethoxysilane, methyltrimethoxysilane, methyltriethoxysilane, ethyltrimethoxysilane, ethyltriethoxysilane, isopropyltrimethoxysilane, isobutyltrimethoxysilane, cyclohexyl trimethoxysilane, n-hexyltrimethoxysilane, n-octyltriethoxysilane, n-decyltrimethoxysilane, phenyltrimethoxysilane, dimethyldimethoxysilane, dimethyidiethoxysilane, diisopropyldimethoxysilane, trimethoxysilyl styrene, γ-(meth) acryloxypropyltrimethoxysilane, 1,3-divinyltetramethyldisiloxane, methylphenyldimethoxysilane, and diphenyidimethoxysilane; a polymerizable double bond-containing silane alkoxide such as vinyltrimethoxysilane, vinyltriethoxysilane, dimethoxymethylvinylsilane, dimethoxyethylvinylsilane, diethoxymethylvinylsilane, diethoxyethylvinylsilane, ethylmethyldivinylsilane, methylvinyldimethoxysilane, ethylvinyldimethoxysilane, methylvinyldiethoxysilane, ethylvinyldiethoxysilane, p-styryltrimethoxysilane, 3-methacryloxypropylmethyldimethoxysilane, 3-methacryloxypropyl trimethoxysilane, 3-methacryloxypropylmethyldiethoxysilane, 3-methacryloxypropyl triethoxy silane, and 3-acryloxypropyltrimethoxysilane; a cyclic siloxane such as decamethylcyclopentasiloxane; a modified (reactive) silicone oil such as one-terminal modified silicone oil, both-terminal silicone oil, and side-chain type silicone oil; and a carboxyl group-containing monomer such as (meth)acrylic acid, maleic acid, and maleic anhydride.

The resin particle can be obtained by polymerizing the polymerizable monomer having an ethylenically unsaturated group. The polymerization method is not particularly limited, and examples thereof include known methods such as radical polymerization, ionic polymerization, polycondensation (condensation polymerization), addition condensation, living polymerization, and living radical polymerization. Other polymerization methods include suspension polymerization in the presence of a radical polymerization initiator.

The resin particle may be a core-shell particle including a core and a shell disposed on a surface of the core. The shell preferably has a chemical structure derived from a polyfunctional epoxy resin and a chemical structure derived from a diamine compound since it is possible to easily control observation of the exothermic peak when differential scanning calorimetry is performed by heating the resin particle at a temperature rising rate of 5° C./min from 100° C. to 350° C. in an air atmosphere. For the same reason, the shell is preferably a shell obtained by reacting a polyfunctional epoxy resin with a diamine compound. As the material of the core, the same material as the preferred material of the resin particle can be used. The core may have a chemical structure derived from a polyfunctional epoxy resin and a chemical structure derived from a diamine compound, or may be a particle obtained by reacting a polyfunctional epoxy resin with a diamine compound.

The particle diameter of the resin particle is preferably 0.1 μm or more, more preferably 1 μm or more, and preferably 100 μm or less, more preferably 80 μm or less. When the particle diameter of the resin particle is the above lower limit or more and the above upper limit or less, the resin particle can be more suitably used for applications of a conductive particle and spacers. From the viewpoint of use as a spacer, the particle diameter of the resin particle is preferably 1 μm or more and 80 μm or less. From the viewpoint of use as a conductive particle, an average particle diameter of the resin particles is preferably 1 μm or more and 20 μm or less.

The particle diameter of the resin particle means a diameter when the resin particle is a true sphere. When the resin particle has a shape other than a true sphere, the particle diameter of the resin particle means a diameter when it is assumed that the resin particle is a true sphere corresponding to the volume. The particle diameter of the resin particle is preferably an average particle diameter, and more preferably a number average particle diameter. The particle diameter of the resin particle can be measured by an arbitrary particle size distribution measuring apparatus. For example, the particle diameter can be measured using a particle size distribution measuring apparatus using principles such as laser light scattering, electric resistance change, and image analysis after imaging can be used. In addition, specific examples of a method for measuring the particle diameter of the resin particle include a method for measuring the particle diameter of about 100,000 resin particles using a particle size distribution measuring device ("Multisizer 4" manufactured by Beckman Coulter, Inc.) and measuring the average value.

A variation coefficient (CV value) of the particle diameter of the resin particle is preferably 10% or less, more preferably 7% or less, still more preferably 5% or less. When the CV value is the above upper limit or less, the resin particle can be more suitably used for applications of a conductive particle and spacers.

The CV value is expressed by the following equation.

$$\text{CV value } (\%) = (\rho/Dn) \times 100$$

ρ: standard deviation of particle diameter of resin particle
Dn: average value of particle diameter of resin particle An aspect ratio of the resin particle is preferably 2 or less, more preferably 1.5 or less, still more preferably 1.2 or less. The aspect ratio indicates a major axis/minor axis. The aspect ratio is preferably determined by observing 10 arbitrary resin particles with an electron microscope or an optical microscope and, provided that the maximum diameter and a minimum diameter is a major axis length and a minor axis length, respectively, calculating an average value of the major axis length/minor axis length of each resin particle.

(Conductive Particle)

The conductive particle includes the resin particle described above and a conductive portion disposed on the surface of the resin particle.

FIG. 1 is a cross-sectional view showing the conductive particle according to a first embodiment of the present invention.

A conductive particle 1 shown in FIG. 1 has a resin particle 11 and a conductive portion 2 disposed on the surface of the resin particle 11. The conductive portion 2 covers the surface of the resin particle 11. The conductive particle 1 is a covered particle in which the surface of the resin particle 11 is covered with the conductive portion 2.

FIG. 2 is a cross-sectional view showing a conductive particle according to a second embodiment of the present invention.

A conductive particle 21 shown in FIG. 2 has a resin particle 11 and a conductive portion 22 disposed on the surface of the resin particle 11. In the conductive particle 21 shown in FIG. 2, only the conductive portion 22 is different from the conductive particle 1 shown in FIG. 1. The conductive portion 22 has a first conductive portion 22A as an inner layer and a second conductive portion 22B as an outer layer. The first conductive portion 22A is disposed on the surface of the resin particle 11. The second conductive portion 22B is disposed on a surface of the first conductive portion 22A.

FIG. 3 is a cross-sectional view showing a conductive particle according to a third embodiment of the present invention.

A conductive particle 31 shown in FIG. 3 includes a resin particle 11, a conductive portion 32, a plurality of core substances 33, and a plurality of insulating substances 34.

The conductive portion 32 is disposed on the surface of the resin particle 11. The conductive particle 31 has a plurality of protrusions 31a on a conductive surface. The conductive portion 32 has a plurality of protrusions 32a on an outer surface. As described above, the conductive particle may have the protrusion on the conductive surface of the conductive particle, or may have the protrusion on the outer surface of the conductive portion. The plurality of core substances 33 are arranged on the surface of the resin particle 11. The plurality of core substances 33 are embedded in the conductive portion 32. The core substance 33 is disposed inside the protrusions 31a and 32a. The conductive portion 32 covers the plurality of core substances 33. The outer surface of the conductive portion 32 is raised by the plurality of core substances 33, and the protrusions 31a and 32a are formed.

The conductive particle 31 includes an insulating substance 34 disposed on the outer surface of the conductive portion 32. At least a partial region of the outer surface of the conductive portion 32 is covered with the insulating substance 34. The insulating substance 34 is formed of an insulating material and is an insulating particle. As described above, the conductive particle may have the insulating substance disposed on the outer surface of the conductive portion.

The metal for forming the conductive portion is not particularly limited. Examples of the metal include gold, silver, palladium, copper, platinum, zinc, iron, tin, lead, aluminum, cobalt, indium, nickel, chromium, titanium, antimony, bismuth, thallium, germanium, cadmium, silicon, tungsten, molybdenum, and alloys of these. Further examples of the metal include tin-doped indium oxide (ITO) and solder. From the viewpoint of further enhancing the connection reliability between the electrodes, the metal is preferably an alloy containing tin, nickel, palladium, copper, or gold, and is preferably nickel or palladium.

Like the conductive particles 1 and 31, the conductive portion may be formed of one layer. Like the conductive particle 21, the conductive portion may be formed of a plurality of layers. That is, the conductive portion may have a laminated structure of two or more layers. When the conductive portion is formed of a plurality of layers, the outermost layer is preferably a gold layer, a nickel layer, a palladium layer, a copper layer, or an alloy layer containing tin and silver, and more preferably a gold layer. When the outermost layer is these preferred conductive portions, the connection reliability between the electrodes can be further enhanced. When the outermost layer is a gold layer, corrosion resistance can be further enhanced.

A method of forming the conductive portion on the surface of the resin particle is not particularly limited. Examples of the method of forming the conductive portion include a method by electroless plating, a method by electroplating, a method by physical vapor deposition, and a method of coating paste containing a metal powder or paste containing a metal powder and a binder on the surface of the resin particle. From the viewpoint of more easily forming the conductive portion, a method by electroless plating is preferable. Examples of the method by physical vapor deposition include methods of vacuum deposition, ion plating, ion sputtering and the like.

The compressive elasticity modulus when the conductive particle is compressed by 10% is defined as a 10%. K value (C). The compressive elasticity modulus when the conductive particle heated at 200° C. for 10 minutes is compressed by 10% is defined as a 10% K value (D). An absolute value of a difference between the 10% K value (C) and the 10% K value (D) is preferably 180 N/mm$^2$ or more, more preferably 500 N/mm$^2$ or more, still more preferably 800 N/mm$^2$ or more, and particularly preferably 1,000 N/mm$^2$ or more. The absolute value of the difference between the 10% K value (C) and the 10% K value (D) is preferably 10,000 N/mm$^2$ or less, more preferably 7,500 N/mm$^2$ or less, and still more preferably 5,000 N/mm$^2$ or less. When the absolute value of the difference between the 10% K value (C) and the 10% K value (D) is the above lower limit or more and the above upper limit or less, the conductive particle can be more uniformly brought into contact with the adherend. When the absolute value of the difference between the 10% K value (C) and the 10% K value (D) is the above lower limit or more and the above upper limit or less, in the case where the electrodes are electrically connected to each other, the adhesion to the conductive portion and the impact resistance can be more effectively enhanced, and, in addition, the connection resistance can be more effectively reduced. The absolute value of the difference between the 10% K value (C) and the 10% K value (D) is particularly preferably 200 N/mm$^2$ or more and 3,000 N/mm$^2$ or less. When the absolute value of the difference between the 10% K value (C) and the 10% K value (D) satisfies the above preferred range, it is possible to more effectively suppress scratching of the adherend by the conductive particle, and it is possible to more uniformly bring the conductive particle into contact with the adherend. When the absolute value of the difference between the 10% K value (C) and the 10% K value (D) satisfies the above preferred range, in the case where the electrodes are electrically connected to each other, the connection resistance can be more effectively reduced, and the connection reliability can be more effectively enhanced.

The 10% K value (C) is preferably 3,000 N/mm$^2$ or more, more preferably 4,000 N/mm$^2$ or more, and preferably 11,000 N/mm$^2$ or less, more preferably 9,000 N/mm$^2$ or less. When the 10% K value (C) is the above lower limit or more and the above upper limit or less, it is possible to more effectively suppress scratching of the adherend by the conductive particle, and it is possible to more uniformly bring the conductive particle into contact with the adherend. When the 10% K value (C) is the above lower limit or more and the above upper limit or less, in the case where the electrodes are electrically connected to each other, the connection resistance can be more effectively reduced, and the connection reliability can be more effectively enhanced.

The compressive elasticity modulus (10% K value (C) and 10% K value (D)) of the conductive particle can be measured as follows.

The conductive particle (conductive particle (C)) is provided. In addition, the conductive particle (conductive particle (D)) heated at 200° C. for 10 minutes is provided. Using a micro compression testing machine, a conductive particle (C) or (D) is compressed at a smooth indenter end face of a cylinder (diameter of 50 μm, made of diamond) under the conditions of a compression rate of 0.3 mN/sec and a maximum test load of 20 mN at 25° C. The load value (N) and compression displacement (mm) at this time are measured. From the obtained measurement values, the compressive elasticity modulus (10% K value (C) or 10% K value (D)) can be determined by the following equation. As the micro compression testing machine, for example, "Fischer Scope H-100" manufactured by FISCHER INSTRUMENTS K.K., or the like is used. The compressive elasticity modulus (10% K value (C) or 10% K value (D)) in the conductive particle (C) or (D) is preferably calculated by arithmetically averaging the compressive elasticity moduli (10% K value (C) or 10% K value (D)) of the 50 conductive particle (C) or (D) arbitrarily selected.

$$10\% \text{ K value}(C) \text{ or } 10\% \text{ K value}(D)(\text{N/mm}^2) = (3/2^{1/2}) \cdot F \cdot S^{-3/2} \cdot R^{-1/2}$$

F: load value (N) when the conductive particle (C) or (D) is 10% compressed and deformed S: compression displacement (mm) when the conductive particle (C) or (D) is 10% compressed and deformed R: radius (mm) of the conductive particle (C) or (D)

The compressive elasticity modulus indicates hardness of the conductive particle universally and quantitatively. Hardness of the conductive particle can be indicated by the compressive elasticity modulus quantitatively and unambiguously.

A compression recovery rate of the conductive particle is preferably 5% or more, more preferably 8% or more, and preferably 60% or less, more preferably 40, or less. When the compression recovery rate is the above lower limit or more and the above upper limit or less, it is possible to more effectively suppress scratching of the adherend by the conductive particle, and it is possible to more uniformly bring the conductive particle into contact with the adherend. When the compression recovery rate is the above lower limit or more and the above upper limit or less, in the case where the electrodes are electrically connected to each other, the connection resistance can be more effectively reduced, and the connection reliability can be more effectively enhanced.

The compression recovery rate of the conductive particle can be measured as follows.

The conductive particles are spread on a sample stage. Using a micro compression testing machine, one of the spread conductive particles is subjected to a load (reverse load value) in a center direction of the conductive particle at a smooth indenter end face of a cylinder (diameter of 50 μm, made of diamond) at 25° C. until the conductive particle is 30% compressed and deformed. After that, unloading is performed up to an origin load value (0.40 mN). The load-compression displacement during this period is measured, and the compression recovery rate can be obtained from the following equation. The loading rate is 0.33 mN/sec. As the micro compression testing machine, for example, "Fischer Scope H-100" manufactured by FISCHER INSTRUMENTS K.K., or the like is used.

Compression recovery rate (%)=[L2/L1]×100

L1: Compression displacement from the origin load value to the reverse load value when a load is applied L2: Unloading displacement from the reverse load value to the origin load value when a load is released The particle diameter of the conductive particle is preferably 0.5 μm or more, more preferably 1.0 μm or more, and preferably 500 μm or less, more preferably 450 μm or less, still more preferably 100 μm or less, even more preferably 50 μm or less, particularly preferably 20 μm or less. If the particle diameter of the conductive particle is the above lower limit or more and the above upper limit or less, when the electrodes are connected to each other using the conductive particle, a contact area between the conductive particle and the electrode becomes sufficiently large, and when the conductive portion is formed, aggregated conductive particles can be hardly formed. In addition, an interval between the electrodes connected via the conductive particle does not become too large, and the conductive portion hardly peels off from the surface of the resin particle. When the particle diameter of the conductive particle is the above lower limit or more and the above upper limit or less, the conductive particle can be suitably used for application of a conductive material.

The particle diameter of the conductive particle means a diameter when the conductive particle is a true sphere. When the conductive particle has a shape other than a true sphere, the particle diameter of the conductive particle means a diameter when it is assumed that the conductive particle is a true sphere corresponding to the volume.

The particle diameter of the conductive particle is preferably an average particle diameter, and more preferably a number average particle diameter. The particle diameter of the conductive particle is determined by observing arbitrary 50 conductive particles with an electron microscope or an optical microscope, and calculating an average value or performing laser diffraction type particle size distribution measurement. In observation with an electron microscope or an optical microscope, the particle diameter of the conductive particle per particle is determined as a particle diameter corresponding to an equivalent circle diameter. In the observation with an electron microscope or an optical microscope, the average particle diameter obtained from the equivalent circle diameters of arbitrary 50 conductive particles is substantially equal to the average particle diameter corresponding to an equivalent sphere diameter. In the laser diffraction type particle size distribution measurement, the particle diameter of the conductive particle per particle is determined as a particle diameter corresponding to an equivalent sphere diameter. The particle diameter of the conductive particle is preferably calculated by laser diffraction particle size distribution measurement.

The thickness of the conductive portion is preferably 0.005 μm or more, more preferably 0.01 μm or more, and preferably 10 μm or less, more preferably 1 μm or less, still more preferably 0.3 μm or less. The thickness of the conductive portion is the thickness of the entire conductive portion when the conductive portion has multiple layers. When the thickness of the conductive portion is not less than the above lower limit and not more than the above upper limit, sufficient conductivity is obtained, and the conductive particle is sufficiently deformed when the electrodes are connected to each other so that the conductive particle does not become too hard.

When the conductive portion is formed of a plurality of layers, the thickness of the conductive portion of the outermost layer is preferably 0.001 μm or more, more preferably 0.01 μm or more, and preferably 0.5 μm or less, more preferably 0.1 μm or less. When the thickness of the conductive portion of the outermost layer is the above lower limit or more and the above upper limit or less, covering by the conductive portion of the outermost layer becomes uniform, corrosion resistance becomes sufficiently high, and the connection reliability between the electrodes can be further enhanced. When the outermost layer is a gold layer, the thinner the gold layer, the lower the cost.

The thickness of the conductive portion can be measured, for example, by observing the cross section of the conductive particle using a transmission electron microscope (TEM). With respect to the thickness of the conductive portion, it is preferable to calculate an average value of the thicknesses of arbitrary five positions of the conductive portion as the thickness of the conductive portion of one conductive particle, and it is more preferable to calculate an average value of the thickness of the entire conductive portion as the thickness of the conductive portion of one conductive particle. The thickness of the conductive portion is preferably determined by calculating an average value of the thickness of the conductive portion of each of arbitrary twenty conductive particles.

The conductive particle preferably has a protrusion on the outer surface of the conductive portion. The conductive particle preferably has a protrusion on a conductive surface. The number of the protrusions is preferably a plural number. An oxide film is often formed on the surface of the conductive portion and the surface of the electrode connected by the conductive particle. When the conductive particle having a protrusion is used, by disposing the conductive particle between the electrodes and pressure-bonding the conductive particle, the oxide film is effectively removed by the protrusions. Thus, the electrode and the conductive portion of the conductive particle can be brought into contact with each other more reliably, and the connection resistance between the electrodes can be further reduced. In addition, when the conductive particle has the insulating substance on a surface thereof, or when the conductive particles are dispersed in a binder resin and used as a conductive material, the insulating substance or the binder resin between the conductive particle and the electrode can be more effectively eliminated by the protrusion of the conductive particle. Thus, the connection reliability between the electrodes can be further enhanced.

Examples of a method of forming the protrusion on the surface of the conductive particle include a method in which the core substance is attached to the surface of the resin particle and then the conductive portion is formed by electroless plating, and a method in which the conductive portion is formed on the surface of the resin particle by electroless plating, then the core substance is attached, and in addition, the conductive portion is formed by electroless plating. The core substance may not be used in order to form the protrusion.

Examples of the method of forming the protrusion include the following method: a method in which a core substance is added at an intermediate stage of forming the conductive portion on the surface of the resin particle by electroless plating; and Examples of a method of forming a protrusion by electroless plating without using a core substance include a method in which a metal nucleus is generated by electroless plating, the metal nucleus is attached to the surface of the resin particle or conductive portion, and a conductive portion is further formed by electroless plating.

The conductive particle preferably further includes an insulating substance disposed on the outer surface of the conductive portion. In this case, when the conductive particle is used for connection between the electrodes, a short circuit between the adjacent electrodes can be prevented. Specifically, since the insulating substance exists between the plurality of electrodes when the plurality of conductive particles come into contact with each other, it is possible to prevent a short circuit not between the upper and lower electrodes but between the electrodes adjacent to each other in a lateral direction. At the time of connection between the electrodes, the insulating substance between the conductive portion of the conductive particle and the electrode can be easily removed by pressurizing the conductive particle with the two electrodes. When the conductive particle has the protrusion on the surface of the conductive portion, the insulating substance between the conductive portion of the conductive particle and the electrode can be more easily removed. The insulating substance is preferably an insulating resin layer or an insulating particle, and more preferably an insulating particle. The insulating particle is preferably an insulating resin particle.

Each of the outer surface of the conductive portion and the surface of the insulating particle may be covered with a compound having a reactive functional group. The outer surface of the conductive portion and the surface of the insulating particle may not be directly chemically bonded, and may be indirectly chemically bonded by the compound having a reactive functional group. After a carboxyl group is introduced into the outer surface of the conductive portion, the carboxyl group may be chemically bonded to the functional group on the surface of the insulating particle via a polymer electrolyte such as polyethyleneimine.

(Conductive Material)

The conductive material contains the conductive particle described above and a binder resin. The conductive particles are preferably dispersed in the binder resin and used as the conductive material. The conductive material is preferably an anisotropic conductive material. The conductive material is suitably used for electrical connection of electrodes. The conductive material is preferably a circuit connecting material.

The binder resin is not particularly limited. As the binder resin, a known insulating resin is used. The binder resin preferably contains a thermoplastic component (thermoplastic compound) or a curable component and more preferably contains the curable component. Examples of the curable component include a photocurable component and a thermosetting component. The photocurable component preferably contains a photocurable compound and a photoinitiator. The thermosetting component preferably contains a thermosetting compound and a thermosetting agent. Examples of the binder resin include a vinyl resin, a thermoplastic resin, a curable resin, a thermoplastic block copolymer, and an elastomer. One kind of the binder resin may be used alone, and two or more kinds thereof may be used in combination.

Examples of the vinyl resin include a vinyl acetate resin, an acrylic resin, and a styrene resin. Examples of the thermoplastic resin include a polyolefin resin, an ethylene-vinyl acetate copolymer resin, and a polyamide resin. Examples of the curable resin include an epoxy resin, a urethane resin, a polyimide resin, and an unsaturated polyester resin. The curable resin may be a room temperature curable resin, a thermosetting resin, a photo-curable resin, or a moisture-curable resin. The curable resin may be used in combination with a curing agent. Examples of the thermoplastic block copolymer include a styrene-butadiene-styrene block copolymer, a styrene-isoprene-styrene block copolymer, a hydrogenated styrene-butadiene-styrene block copolymer, and a hydrogenated styrene-isoprene-styrene block copolymer. Examples of the elastomer include a styrene-butadiene copolymer rubber and an acrylonitrile-styrene block copolymer rubber.

In addition to the conductive particle and the binder resin, the conductive material may contain, for example, various additives such as a filler, an extender, a softener, a plasticizer, a polymerization catalyst, a curing catalyst, a colorant, an antioxidant, a thermal stabilizer, a light stabilizer, an ultraviolet absorber, a lubricant, an antistatic agent, and a flame retardant.

As a method of dispersing the conductive particles in the binder resin, a conventionally known dispersion method can be used, and the dispersion method is not particularly limited. Examples of the method of dispersing the conductive particles in the binder resin include the following methods: a method in which, after the conductive particles have been added to the binder resin, this mixture is kneaded by a planetary mixer or the like to be dispersed; a method in which, after the conductive particles have been uniformly dispersed in water or an organic solvent by using a homogenizer or the like, this dispersion solution is added to a binder resin and kneaded by a planetary mixer or the like to be dispersed; and a method in which, after the binder resin has been diluted by water, an organic solvent or the like, the conductive particles are added to this solution, and kneaded by a planetary mixer or the like to be dispersed.

The viscosity (η25) of the conductive material at 25° C. is preferably 30 Pa·s or more, more preferably 50 Pa·s or more, and preferably 400 Pa·s or less, more preferably 300 Pa·s or less. When the viscosity of the conductive material at 25° C. is the above lower limit or more and the above upper limit or less, the connection reliability between the electrodes can be more effectively enhanced. The viscosity (η25) can be appropriately adjusted depending on the type of compounded components and the blending amount.

The viscosity (η25) can be measured under conditions of 25° C. and 5 rpm, for example, using an E-type viscometer ("TVE22L" manufactured by Toki Sangyo Co., Ltd.) or the like.

The conductive material may be used as a conductive paste, a conductive film, or the like. When the conductive material according to the present invention is a conductive film, a film not containing a conductive particle may be stacked on the conductive film containing the conductive particle. The conductive paste is preferably an anisotropic conductive paste. The conductive film is preferably an anisotropic conductive film.

The content of the binder resin in 100% by weight of the conductive material is preferably 10% by weight or more, more preferably 30% by weight or more, still more preferably 50% by weight or more, particularly preferably 70% by weight or more, and preferably 99.99% by weight or less, more preferably 99.9% by weight or less. When the content of the binder resin is the above lower limit or more and the above upper limit or less, the conductive particle is efficiently disposed between the electrodes, and the connection reliability of the connection object member connected by the conductive material is further enhanced.

The content of the conductive particles in 100% by weight of the conductive material is preferably 0.01% by weight or more, more preferably 0.1% by weight or more, and preferably 80% by weight or less, more preferably 60% by weight or less, still more preferably 40% by weight or less, even more preferably 20% by weight or less, particularly preferably 10% by weight or less. When the content of the conductive particles is the above lower limit or more and the above upper limit or less, the connection resistance between the electrodes can be more effectively reduced, and the connection reliability between the electrodes can be more effectively enhanced.

(Connection Structure)

A connection structure can be obtained by connecting the connection object member using the conductive particle described above or a conductive material containing the conductive particles and the binder resin described above.

The connection structure includes a first connection object member having a first electrode on a surface thereof, a second connection object member having a second electrode on a surface thereof, and a connection portion connecting the first connection object member and the second connection object member. In the connection structure, the connection portion is formed of a conductive particle or formed of a conductive material containing the conductive particles and a binder resin. The conductive particle includes the resin particle described above and a conductive portion disposed on the surface of the resin particle. In the connection structure, the first electrode and the second electrode are electrically connected by the conductive particles.

When the conductive particle is used alone, the connection portion itself is a conductive particle. That is, the first connection object member and the second connection object member are connected by the conductive particles. The conductive material used to obtain the connection structure is preferably an anisotropic conductive material.

FIG. 4 is a cross-sectional view showing an example of the connection structure using the conductive particle according to the first embodiment of the present invention.

A connection structure 41 shown in FIG. 4 includes a first connection object member 42, a second connection object member 43, and a connection portion 44 connecting the first connection object member 42 and the second connection object member 43. The connection portion 44 is formed of a conductive material containing the conductive particles 1 and a binder resin. In FIG. 4, for convenience of illustration, the conductive particle 1 is schematically illustrated. Other conductive particles of the conductive particles 21 and 31 may be used in place of the conductive particle 1.

The first connection object member 42 has a plurality of first electrodes 42a on a surface thereof (upper surface). The second connection object member 43 has a plurality of second electrodes 43a on a surface thereof (lower surface). The first electrode 42a and the second electrode 43a are electrically connected by one or the plurality of conductive particles 1. Therefore, the first and second connection object members 42 and 43 are electrically connected by the conductive particle 1.

A method of producing the connection structure is not particularly limited. An example of the method of producing the connection structure includes a method in which the conductive material is disposed between the first connection object member and the second connection object member to obtain a laminate, and then the laminate is heated and pressurized. The pressure at the time of pressurization is preferably 40 MPa or more, more preferably 60 MPa or more, and preferably 90 MPa or less, more preferably 70 MPa or less. The temperature at the time of heating is preferably 80° C. or more, more preferably 100° C. or more, and preferably 140° C. or less, more preferably 120° C. or less.

The first connection object member and the second connection object member are not particularly limited. Specific examples of the first connection object member and the second connection object member include electronic components such as a semiconductor chip, a semiconductor package, an LED chip, an LED package, a capacitor and a diode, and electronic components such as a resin film, a printed board, a flexible printed board, a flexible flat cable, a rigid flexible substrate, a glass epoxy substrate, and a circuit board such as a glass substrate. The first connection object member and the second connection object member are preferably electronic components.

The conductive material is preferably a conductive material for connecting electronic components. The conductive paste is a paste-like conductive material, and is preferably applied in a paste-like state onto the connection object member.

The conductive particle, the conductive material, and the connection material are also suitably used for a touch panel. Therefore, the connection object member is preferably a flexible substrate or a connection object member in which an electrode is disposed on a surface of a resin film. The connection object member is preferably the flexible substrate or the connection object member in which the electrode is disposed on the surface of the resin film. When the flexible substrate is a flexible printed substrate or the like, the flexible substrate generally has an electrode on a surface thereof.

Examples of the electrode provided on the connection object member include metal electrodes such as a gold electrode, a nickel electrode, a tin electrode, an aluminum electrode, a copper electrode, a molybdenum electrode, a silver electrode, a SUS electrode, and a tungsten electrode. When the connection object member is a flexible printed board, the electrode is preferably a gold electrode, a nickel electrode, a tin electrode, a silver electrode or a copper electrode. When the connection object member is a glass substrate, the electrode is preferably an aluminum electrode, a copper electrode, a molybdenum electrode, or a tungsten electrode. When the electrode is an aluminum electrode, it may be an electrode formed only of aluminum, or may be an electrode with an aluminum layer stacked on the surface of a metal oxide layer. Examples of the material of the metal oxide layer include indium oxide doped with a trivalent metal element and zinc oxide doped with a trivalent metal element. Examples of the trivalent metal element include Sn, Al, and Ga.

The resin particle can be suitably used as a spacer for a liquid crystal display element. The first connection object member may be a first liquid crystal display element member. The second connection object member may be a second liquid crystal display element member. The connection portion may be a seal portion that seals an outer periphery of the first liquid crystal display element member and the second liquid crystal display element member in a state where the first liquid crystal display element member and the second liquid crystal display element member face each other.

The resin particle can also be used as a peripheral sealant for a liquid crystal display element. The liquid crystal display element includes the first liquid crystal display element member and the second liquid crystal display element member. The liquid crystal display element further includes the seal portion that seals the outer periphery of the first liquid crystal display element member and the second liquid crystal display element member in the state where the first liquid crystal display element member and the second liquid crystal display element member face each other, and a liquid crystal disposed between the first liquid crystal display element member and the second liquid crystal display element member inside the seal portion. In this liquid crystal display element, a liquid crystal dropping method is applied, and the seal portion is formed by thermally curing a sealant for liquid crystal dropping method.

In the liquid crystal display element, an arrangement density of the spacer for a liquid crystal display element per 1 $mm^2$ is preferably 10/$mm^2$ or more and preferably 1000/$mm^2$ or less. When the arrangement density is 10 pieces/$mm^2$ or more, a cell gap is further uniform. When the arrangement density is 1,000 pieces/$mm^2$ or less, contrast of the liquid crystal display element is further improved.

(Electronic Component Device)

The resin particle or the conductive particle described above is disposed between a first ceramic member and a second ceramic member in an outer peripheral portion of the first ceramic member and the second ceramic member, and can also be used as a gap control material and a conductive connection material.

FIG. 5 is a cross-sectional view showing an example of an electronic component device using the resin particle according to the present invention. FIG. 6 is an enlarged cross-sectional view showing a joint region in the electronic component device shown in FIG. 5.

An electronic component device 81 shown in FIGS. 5 and 6 includes a first ceramic member 82, a second ceramic member 83, a joint portion 84, an electronic component 85, and a lead frame 86.

Each of the first and second ceramic members 82 and 83 is formed of a ceramic material. Each of the first and second ceramic members 82 and 83 is, for example, a housing. The first ceramic member 82 is, for example, a substrate. The second ceramic member 83 is, for example, a lid. The first ceramic member 82 has a protrusion protruding to the second ceramic member 83 side (upper side) on an outer peripheral portion. The first ceramic member 82 has a recess forming an internal space R for housing the electronic component 85 on the second ceramic member 83 side (upper side). The first ceramic member 82 may not have any protrusion. The second ceramic member 83 has a protrusion protruding to the first ceramic member 82 side (lower side) on an outer peripheral portion. The second ceramic member 83 has the recess forming the internal space R for housing the electronic component 85 on the first ceramic member 82 side (lower side). The second ceramic member 83 may not have any protrusion. The first ceramic member 82 and the second ceramic member 83 form the internal space R.

The joint portion 84 joins the outer peripheral portion of the first ceramic member 82 and the outer peripheral portion of the second ceramic member 83. Specifically, the joint portion 84 joins the protrusion of the outer peripheral portion of the first ceramic member 82 and the protrusion of the outer peripheral portion of the second ceramic member 83.

A package is formed by the first and second ceramic members 82 and 83 joined by the joint portion 84. The internal space R is formed by the package. The joint portion 84 liquid-tightly and airtightly seals the internal space R. The joint portion 84 is a sealing portion.

The electronic component 85 is disposed in the internal space R of the package. Specifically, the electronic component 85 is disposed on the first ceramic member 82. In the present embodiment, the two electronic components 85 are used.

The joint portion 84 includes a plurality of the resin particles 11 and glass 84B. The joint portion 84 is formed using a joint material containing the plurality of resin particles 11 different from glass particles and the glass 84B. The joint material is a joint material for a ceramic package. The joint material may contain the above-described conductive particles in place of the resin particles.

The joint material may contain a solvent or a resin. In the joint portion 84, the glass 84B such as glass particles is melted and joined and then solidified.

Examples of the electronic component include a sensor element, a MEMS, and a bare chip. Examples of the sensor element include a pressure sensor element, an acceleration sensor element, a CMOS sensor element, a CCD sensor element, and housings of the various sensor elements.

The lead frame 86 is disposed between the outer peripheral portion of the first ceramic member 82 and the outer peripheral portion of the second ceramic member 83. The lead frame 86 extends to the internal space R side and an external space side of the package. A terminal of the electronic component 85 and the lead frame 86 are electrically connected via a wire.

The joint portion 84 partially directly joins and partially indirectly joins the outer peripheral portion of the first ceramic member 82 and the outer peripheral portion of the second ceramic member 83. Specifically, the joint portion 84 indirectly joins the outer peripheral portion of the first ceramic member 82 and the outer peripheral portion of the second ceramic member 83 via the lead frame 86 at a portion where there is the lead frame 86 between the outer peripheral portion of the first ceramic member 82 and the outer peripheral portion of the second ceramic member 83. At the portion where there is the lead frame 86 between the outer peripheral portion of the first ceramic member 82 and the outer peripheral portion of the second ceramic member 83, the first ceramic member 82 is in contact with the lead frame 86, and the lead frame 86 is in contact with the first ceramic member 82 and the joint portion 84. In addition, the joint portion 84 is in contact with the lead frame 86 and the second ceramic member 83, and the second ceramic member 83 is in contact with the joint portion 84. The joint portion 84 directly joins the outer peripheral portion of the first ceramic member 82 and the outer peripheral portion of the second ceramic member 83 at a portion without the lead frame 86 between the outer peripheral portion of the first ceramic member 82 and the outer peripheral portion of the second ceramic member 83. The joint portion 84 is in contact with the first ceramic member 82 and the second ceramic member 83 at the portion without the lead frame 86 between the outer peripheral portion of the first ceramic member 82 and the outer peripheral portion of the second ceramic member 83.

At the portion where there is the lead frame 86 between the outer peripheral portion of the first ceramic member 82 and the outer peripheral portion of the second ceramic member 83, a distance of a gap between the outer peripheral portion of the first ceramic member 82 and the outer peripheral portion of the second ceramic member 83 is controlled by the plurality of resin particles 11 included in the joint portion 84.

The joint portion may directly or indirectly join the outer peripheral portion of the first ceramic member and the outer peripheral portion of the second ceramic member. An electrical connection method other than the lead frame may be adopted.

As in the electronic component device 81, the electronic component device may include, for example, a first ceramic member formed of a ceramic material, a second ceramic member formed of a ceramic material, a joint portion, and an electronic component. In the electronic component device, the joint portion may directly or indirectly join the outer peripheral portion of the first ceramic member and the outer peripheral portion of the second ceramic member. In the electronic component device, the package may be formed of the first and second ceramic members joined by the joint portion. In the electronic component device, the electronic component may be disposed in an internal space of the package, and the joint portion may contain a plurality of resin particles and glass.

Like the joint material used in the electronic component device 81, the joint material for a ceramic package is used for forming the joint portion in the electronic component device, and contains resin particles and glass. An electrical connection method including only resin particles and not including glass may be adopted. The joint portion may contain the above-described conductive particles in place of the resin particles.

The present invention will be specifically described below by way of Examples and Comparative Examples. The present invention is not limited only to the following Examples.

Example 1

(1) Preparation of Resin Particle

A reaction vessel equipped with a thermometer, a stirrer, and a cooling tube was charged with 15 parts by weight of 2,2-bis(4-glycidyloxyphenyl)propane (manufactured by Tokyo Chemical Industry Co., Ltd.), 7.5 parts by weight of polyvinylpyrrolidone as a dispersion stabilizer, and 250 parts by weight of ethanol, and the mixture was stirred at 65° C. for 1 hour to be uniformly dissolved. Next, 4.37 parts by weight of 4,4'-diaminodiphenylmethane and 35 parts by weight of ethanol were uniformly dissolved, and then the solution was placed in a reaction vessel and reacted at 65° C. for 24 hours to obtain a reaction product. The obtained reaction product was washed and dried to obtain a resin particle.

(2) Preparation of Conductive Particle

In 100 parts by weight of an alkali solution containing 5% by weight of a palladium catalyst liquid, 10 parts by weight of the obtained resin particles were dispersed using an ultrasonic disperser, and then the solution was filtered to take out the resin particles. Then, the resin particles were added to 100 parts by weight of a 1 wt % dimethylamine borane solution to activate the surface of the resin particle. The surface-activated resin particles were thoroughly washed with water and then added to and dispersed in 500 parts by weight of distilled water to obtain a dispersion.

A nickel plating solution (pH 8.5) containing nickel sulfate at 0.35 mol/L, dimethylamine borane at 1.38 mol/L, and sodium citrate at 0.5 mol/L was provided.

While the obtained dispersion was stirred at 60° C., the nickel plating solution was gradually added dropwise to the dispersion to perform electroless nickel plating. Thereafter, the particles were taken out by filtering the dispersion, washed with water, and dried to obtain conductive particles in which a nickel-boron conductive layer was formed on the surface of the resin particle and the conductive portion was provided on the surface.

(3) Preparation of Conductive Material (Anisotropic Conductive Paste)

A conductive material (anisotropic conductive paste) was obtained by blending 7 parts by weight of the obtained conductive particles, 25 parts by weight of a bisphenol A type phenoxy resin, 4 parts by weight of a fluorene type epoxy resin, 30 parts by weight of a phenol novolac type epoxy resin, and SI-60L (manufactured by Sanshin Chemical Industry Co., Ltd.) and defoaming and stirring the mixture for 3 minutes.

(4) Preparation of Connection Structure

A transparent glass substrate (first connection object member) on which an IZO electrode pattern (first electrode, Vickers hardness of metal on electrode surface: 100 Hv) having an L/S of 10 μm/10 μm was formed on an upper surface was provided. A semiconductor chip (second connection object member) on which an Au electrode pattern (second electrode, Vickers hardness of metal on electrode surface: 50 Hv) having an L/S of 10 μm/10 μm was formed on a lower surface was provided. The obtained anisotropic conductive paste was applied onto the transparent glass substrate so as to have a thickness of 30 μm to form an anisotropic conductive paste layer. Then, the semiconductor chip was stacked on the anisotropic conductive paste layer such that the electrodes faced each other. Thereafter, a pressure heating head was placed on an upper surface of the semiconductor chip while the temperature of the head was adjusted so that the temperature of the anisotropic conductive paste layer was 100° C., and a pressure of 55 MPa was applied to cure the anisotropic conductive paste layer at 100° C., and thus to obtain a connection structure.

Example 2

In the preparation of resin particles, a glycidylamine type epoxy resin ("TETRAD-X" manufactured by Mitsubishi Gas Chemical Company, Inc.) was used in place of 2,2-bis (4-glycidyloxyphenyl)propane, and isopropyl alcohol was used in place of ethanol. In addition, the blending amount of 4,4'-diaminodiphenylmethane was changed from 4.37 parts by weight to 7.53 parts by weight. The resin particles, the conductive particles, the conductive material, and the connection structure were obtained in the same manner as in Example 1 except for the above changes.

Example 3

In the preparation of the resin particles, a triazine-type epoxy resin ("TEPIC-PAS" manufactured by Nissan Chemical Corporation) was used in place of 2,2-bis(4-glycidyloxyphenyl) propane. In place of 4.37 parts by weight of 4,4'-diaminodiphenylmethane, 1.63 parts by weight of ethylenediamine was used. The resin particles, the conductive particles, the conductive material, and the connection structure were obtained in the same manner as in Example 1 except for the above changes.

Example 4

In the preparation of the resin particles, a glycidylamine type epoxy resin ("JER-630" manufactured by Mitsubishi Chemical Corporation) was used in place of 2,2-bis(4-glycidyloxyphenyl)propane. In addition, the blending amount of 4,4'-diaminodiphenylmethane was changed from 4.37 parts by weight to 7.63 parts by weight. The resin particles, the conductive particles, the conductive material, and the connection structure were obtained in the same manner as in Example 1 except for the above changes.

Example 5

In the preparation of the resin particles, an alicyclic glycidylamine type epoxy resin ("TETRAD-C" manufactured by Mitsubishi Gas Chemical Company, Inc.) was used in place of 2,2-bis(4-glycidyloxyphenyl)propane, and isopropyl alcohol was used in place of ethanol. In addition, the blending amount of 4,4'-diaminodiphenylmethane was changed from 4.37 parts by weight to 7.44 parts by weight. The resin particles, the conductive particles, the conductive material, and the connection structure were obtained in the same manner as in Example 1 except for the above changes.

Example 6

In the preparation of the conductive particles, 1 g of nickel particle slurry (average particle diameter: 100 nm) was added to a dispersion over 3 minutes to obtain a suspension containing resin particles to which a core substance was attached. The conductive particles, the conductive material, and the connection structure were obtained in the same manner as in Example 1 except that the suspension was used in place of the dispersion.

Example 7

(1) Preparation of Insulating Particles

A 1,000 mL separable flask equipped with a 4-necked separable cover, a stirring blade, a three-way cock, a cooling tube, and a temperature probe was charged with the following monomer composition, then distilled water was added so that a solid content of the following monomer composition was 10% by weight, and the mixture was stirred at 200 rpm and polymerized at 60° C. for 24 hours in a nitrogen atmosphere. The monomer composition contains 360 mmol of methyl methacrylate, 45 mmol of glycidyl methacrylate, 20 mmol of parastyryl diethyl phosphine, 13 mmol of ethylene glycol dimethacrylate, 0.5 mmol of polyvinylpyrrolidone, and 1 mmol of 2,2'-azobis{2-[N-(2-carboxyethyl) amidino]propane}. After completion of the reaction, the reactant was freeze-dried to obtain insulating particles (particle diameter: 360 nm) having on a surface thereof a phosphorus atom derived from parastyryl diethyl phosphine.

(2) Preparation of Conductive Particles with Insulating Particles

The conductive particles obtained in Example 6 were provided. The insulating particles obtained above were dispersed in distilled water under ultrasonic irradiation to obtain a 10 wt % aqueous dispersion of insulating particles. After dispersing 10 g of the provided conductive particles in 500 mL of distilled water, 1 g of the 10 wt % aqueous dispersion of insulating particles was added, and the mixture was stirred at room temperature for 8 hours. After filtration with a 3 μm mesh filter, the resulting product was further washed with methanol and dried to obtain conductive particles with insulating particles. The conductive material and the connection structure were obtained in the same manner as in Example 1 except that the conductive particles with insulating particles were used in place of the conductive particles.

Example 8

(1) Preparation of Resin Particle

As seed particles, polystyrene particles having an average particle diameter of 0.93 μm were provided. A mixed solution was prepared by mixing 3.9 parts by weight of the polystyrene particles, 500 parts by weight of ion-exchanged water, and 120 parts by weight of a 5 wt % polyvinyl alcohol aqueous solution. The mixed solution was dispersed by ultrasonic waves, then put into a separable flask, and stirred uniformly.

Next, the following monomer component, 2 parts by weight of 2,2'-azobis (methyl isobutyrate) ("V-601" manufactured by Wako Pure Chemical Industries, Ltd.), 2 parts by weight of benzoyl peroxide ("Niper BW" manufactured by NOF CORPORATION), and 4 parts by weight of 2,2-bis(4, 4-di-tertiary-butylperoxycyclohexyl) propane ("Pertetra A" manufactured by NOF CORPORATION) were mixed. The monomer component includes 30 parts by weight of 1,6-hexanediol dimethacrylate and 120 parts by weight of styrene. In addition, 9 parts by weight of triethanolamine lauryl sulfate, 30 parts by weight of ethanol (solvent), and 1100 parts by weight of ion-exchanged water were added to prepare an emulsion.

The emulsion was added to the mixed solution in the separable flask in several times, and the mixture was stirred for 12 hours to allow the seed particles to absorb the monomer, thereby obtaining a suspension containing the seed particles swollen with the monomer.

Thereafter, 490 parts by weight of a 5 wt % polyvinyl alcohol aqueous solution was added, heating was started, and the mixture was reacted at 85° C. for 9 hours to obtain resin particles.

The conductive particles, the conductive material, and the connection structure were obtained in the same manner as in Example 1 except that the obtained resin particles were used.

Example 9

The conductive particles, the conductive material, and the connection structure were obtained in the same manner as in Example 8 except that 75 parts by weight of hexylethyl methacrylate and 75 parts by weight of glycidyl methacrylate were used in place of 30 parts by weight of 1,6-hexanediol dimethacrylate and 120 parts by weight of styrene in the preparation of the resin particles.

Example 10

The conductive particles, the conductive material, and the connection structure were obtained in the same manner as in Example 8 except that 150 parts by weight of 1,3-butylene glycol dimethacrylate was used in place of 30 parts by weight of 1,6-hexanediol dimethacrylate and 120 parts by weight of styrene in the preparation of the resin particles.

Example 11

In the preparation of the resin particles, 2.34 parts by weight of 1,4-phenylenediamine was used in place of 4.37 parts by weight of 4,4'-diaminodiphenylmethane. The resin particles, the conductive particles, the conductive material, and the connection structure were obtained in the same manner as in Example 1 except for the above changes.

Example 12

In the preparation of the resin particles, 8.90 parts by weight of 2,2-bis[4-(4-aminophenoxy)phenyl]propane was used in place of 4.37 parts by weight of 4,4'-diaminodiphenylmethane. The resin particles, the conductive particles, the conductive material, and the connection structure were obtained in the same manner as in Example 1 except for the above changes.

Comparative Example 1

As the resin particles, "Optobead 3500M" (melamine-based resin, particle diameter: 3.5 μm) manufactured by Nissan Chemical Corporation was provided. The conductive particles, the conductive material, and the connection structure were obtained in the same manner as in Example 1 except that the provided resin particles were used.

Example 13

In a reaction vessel equipped with a thermometer, a stirrer, and a cooling tube, 50 parts by weight of "Micropearl SP 210" ((meth)acrylic resin, particle diameter: 10 μm) manufactured by Sekisui Chemical Co., Ltd. as base material core resin particles, 500 parts by weight of water, and 125 parts by weight of polyallylamine as a dispersion stabilizer were charged, mixed uniformly, and then reacted at 25° C. for 1 hour to obtain a reaction product. The obtained reaction product was washed and dried to obtain base material core resin particles In a reaction vessel, 30 parts by weight of the obtained base material core resin particles, 23 parts by weight of 2,2-bis(4-glycidyloxyphenyl)propane as a shell forming material, 13.5 parts by weight of 2,2-bis[4-(4-aminophenoxy)phenyl]propane, 6.8 parts by weight of polyvinylpyrrolidone as a dispersion stabilizer, and 250 parts by weight of ethanol were placed and mixed uniformly. Then, the mixture was reacted at 65° C. for 24 hours to obtain a reaction product. The obtained reaction product was washed and dried to obtain core-shell particles. The conductive particles, the conductive material, and the connection structure were obtained in the same manner as in Example 1 except that the obtained core-shell particles were used as the resin particles.

(Evaluation)
(1) Differential Scanning Calorimetry

The obtained resin particles (10 mg) was heated from 100° C. to 350° C. at a temperature rising rate of 5° C./min in an air atmosphere to perform differential scanning calorimetry. For the differential scanning calorimetry, "DSC 6220" manufactured by Hitachi High-Tech Science Corporation was used. From the obtained measurement result, it was confirmed whether or not the exothermic peak was observed and whether or not the endothermic peak was observed. The exothermic peak was a peak having an exothermic amount of 1,000 mJ/mg or more, and the endothermic peak was a peak having an endothermic amount of 2,000 mJ/mg or more.

When the exothermic peak was observed, the peak temperature and the exothermic amount at the exothermic peak having the largest peak area among the observed exothermic peaks were calculated.

(2) Compressive Elasticity Modulus of Resin Particles

For the obtained resin particles, the compressive elasticity modulus (10% K value (A)) when the resin particles were compressed by 10% and the compressive elasticity modulus (10% K value (B)) when the resin particles heated at 200° C. for 10 minutes were compressed by 10% were measured by the above-described method using a micro compression testing machine ("Fischer Scope H-100" manufactured by FISCHER INSTRUMENTS K.K.). From the measurement result, the absolute value of the difference between the 10% K value (A) and the 10% K value (B) was calculated.

(3) Compression Recovery Rate of Resin Particles

With respect to the obtained resin particles, the compression recovery rate of the resin particles was measured by the above-described method using a micro compression testing machine ("Fischer Scope H-100" manufactured by FISCHER INSTRUMENTS K.K.).

(4) Particle Diameter of Resin Particle and CV Value of Particle Diameter of Resin Particle With respect to the obtained resin particles, the particle diameter of about 100,000 resin particles was measured using a particle size distribution measuring device ("Multisizer 4" manufactured by Beckman Coulter, Inc.), and the average value was calculated. From the measurement result of the particle diameter of the resin particles, the CV value of the particle diameter of the resin particles was calculated from the following equation.

$$\text{CV value (\%)} = (\rho/Dn) \cdot 100$$

ρ: standard deviation of particle diameter of resin particle
Dn: average value of particle diameter of resin particle (5) Thickness of Conductive Portion The conductive particles obtained were added to and dispersed in "Technovit 4000" manufactured by Kulzer BmbH so as to have a content of 30% by weight, thereby fabricating a particle-embedded resin for inspection. The cross section of the conductive particle was cut out so as to pass near the center of the conductive particle dispersed in the embedded resin for inspection using an ion milling apparatus ("IM 4000" manufactured by Hitachi High-Technologies Corporation).

Thereafter, using a field emission transmission electron microscope (FE-TEM) ("JEM-ARM200F" manufactured by JEOL Ltd.), the image magnification was set to 50,000-fold, 20 conductive particles were randomly selected, and the conductive portion of each conductive particle was observed. The thickness of the conductive portion of each conductive particle was measured, and the value was arithmetically averaged to take as the thickness of the conductive portion.

(6) Compressive Elasticity Modulus of Conductive Particles

For the obtained conductive particles, the compressive elasticity modulus (10% K value (C)) when the conductive particles were compressed by 10% and the compressive elasticity modulus (10% K value (D)) when the conductive particles heated at 200° C. for 10 minutes were compressed by 10% were measured by the above-described method using a micro compression testing machine ("Fischer Scope H-100" manufactured by FISCHER INSTRUMENTS K.K.). From the measurement result, the absolute value of the difference between the 10% K value (C) and the 10% K value (D) was calculated.

(7) Compression Recovery Rate of Conductive Particles

With respect to the obtained conductive particles, the compression recovery rate of the conductive particles was measured by the above-described method using a micro compression testing machine ("Fischer Scope H-100" manufactured by FISCHER INSTRUMENTS K.K.).

(8) Adhesion Between Resin Particles and Conductive Portion

With respect to the obtained connection structure, the conductive particles in the connection portion were observed using a scanning electron microscope ("Regulus 8220" manufactured by Hitachi High-Technologies Corporation). For the 100 conductive particles observed, whether or not the conductive portion disposed on the surface of the resin particle was peeled off was confirmed. The adhesion between the resin particle and the conductive portion was accessed according to the following criteria.

[Assessment Criteria for Adhesion Between Resin Particles and Conductive Portion]

∘∘∘: The number of conductive particles with peeled conductive portion is 0.

∘∘: The number of conductive particles with peeled conductive portion is more than 0 and 15 or less.

∘: The number of conductive particles with peeled conductive portion is more than 15 and 30 or less.

Δ: The number of conductive particles with peeled conductive portion is more than 30 and 50 or less.

x: The number of conductive particles with peeled conductive portion is more than 50.

(9) Shape Preserving Characteristics of Conductive Particles

With respect to the obtained connection structure, the conductive particles in the connection portion were observed using a scanning electron microscope ("Regulus 8220" manufactured by Hitachi High-Technologies Corporation). It was confirmed whether or not the compressed shape was preserved for the 100 conductive particles observed. Shape preserving characteristics of the conductive particles were assessed according to the following criteria.

[Assessment Criteria for Shape Preserving Characteristics of Conductive Particles]

∘∘∘: The number of conductive particles preserving the compressed shape is 90 or more.

∘∘: The number of conductive particles preserving the compressed shape is 70 or more and less than 90.

∘: The number of conductive particles preserving the compressed shape is 50 or more and less than 70.

Δ: The number of conductive particles preserving the compressed shape is 1 or more and less than 50.

x: The conductive particles do not preserve the compressed shape, or the conductive particles are broken.

(10) Connection Reliability (Between Upper and Lower Electrodes)

The connection resistances between the upper and lower electrodes in the 20 connection structures obtained were measured by a four-terminal method. An average value of the connection resistance was calculated. From the relationship of voltage=current×resistance, the connection resistance can be obtained by measuring the voltage when a constant current flows. The connection reliability was assessed according to the following criteria.

[Assessment Criteria for Connection Reliability]

∘∘∘: The average value of connection resistances is 1.5Ω or less

∘∘: The average value of connection resistances is more than 1.5Ω and 2.0Ω or less ∘: The average value of connection resistances is more than 2.0Ω and 5.0Ω or less Δ: The average value of connection resistances is more than 5.0Ω and 10Ω or less x: The average value of connection resistances is more than 10 Ω

(11) Impact Resistance

The connection structure obtained in the evaluation of (10) Connection reliability was dropped from a position of 70 cm in height, and the impact resistance was evaluated by confirming the connection resistance in the same manner as in the evaluation of (10). The impact resistance was assessed according to the following criteria from a rate of increase in the resistance value from the average value of the connection resistances obtained in the evaluation of (10).

[Assessment Criteria for Impact Resistance]

∘: The rate of increase in the resistance value from the average value of the connection resistances is 30% or less Δ: The rate of increase in the resistance value from the average value of the connection resistances exceeds 30% and is 50% or less x: The rate of increase in the resistance value from the average value of the connection resistances exceeds 50%

(12) Connection Reliability after High-Temperature and High-Humidity Conditions

The 100 connection structures obtained in the evaluation of (10) Connection reliability were left to stand at 85° C. and 85% RH for 100 hours. For the 100 connection structures after being left to stand, evaluations were made on whether a conduction failure between upper and lower electrodes occurred or not. The connection reliability after high-temperature and high-humidity conditions was assessed according to the following criteria.

[Assessment Criteria for Connection Reliability after High-Temperature and High-Humidity Conditions]

∘∘: Among the 100 connection structures, the number of connection structures in which a conduction failure occurs is 1 or less ∘: Among the 100 connection structures, the number of connection structures in which a conduction failure occurs is 2 or more and 5 or less Δ: Among the 100 connection structures, the number of connection structures in which a conduction failure occurs is 6 or more and 10 or less x: Among the 100 connection structures, the number of connection structures in which a conduction failure occurs is 11 or more.

The composition of the materials and the results are shown in Tables 1 to 5.

TABLE 1

|  |  | Example 1 | Example 2 | Example 3 |
|---|---|---|---|---|
| Material of resin particle | Main agent A: type of epoxy monomer | 2,2-bis (4-glycidyloxyphenyl)propane | Glycidylamine type epoxy resin (TETRAD-X) | Triazine-type epoxy resin (TEPIC-PAS) |
|  | Content of main agent A [part(s) by weight] | 15 | 15 | 15 |
|  | Type of dispersion stabilizer | Polyvinylpyrrolidone | Polyvinylpyrrolidone | Polyvinylpyrrolidone |
|  | Content of disperion stabilizer [part(s) by weight] | 7.5 | 7.5 | 7.5 |
|  | Type of reaction solvent 1 | Ethanol | Isopropyl alcohol | Ethanol |
|  | Content of reaction solvent 1 | 250 | 250 | 250 |
|  | Main agent B: type of diamine monomer | 4,4'-diaminodiphenylmethane | 4,4'-diaminodiphenylmethane | Ethylenediamine |
|  | Content of main agent B [part(s) by weight] | 4.37 | 7.53 | 1.63 |
|  | Type of reaction solvent 2 | Ethanol | Isopropyl alcohol | Ethanol |
|  | Content of reaction solvent 2 [part(s) by weight] | 35 | 35 | 35 |
|  | Other particles | — | — | — |
| Configuration of conductive particle | Ni core substance | Absence (A) | A | A |
|  | Insulating particle | A | A | A |
| Evaluation of resin particle | Presence or absence of exothermic peak | Presence (P) | P | P |
|  | Peak temperature (° C.) at exothermic peak having largest peak area | 330 | 310 | 280 |
|  | Exothermic amount (mJ/mg) at exothermic peak having largest peak area | 17000 | 18000 | 16000 |
|  | Presence or absence of endothermic peak | A | A | A |
|  | 10% K value (A) (N/mm$^2$) | 2010 | 1200 | 2230 |
|  | 10% K value (B) (N/mm$^2$) | 2240 | 3080 | 2840 |
|  | Absolute value (N/mm$^2$) of difference between 10% K value (A) and 10% K value (B) | 230 | 1880 | 610 |
|  | Compression recovery rate (%) | 22 | 23 | 12 |
|  | Particle diameter (μm) | 7.0 | 7.4 | 2.6 |
|  | CV value (%) | 10.6 | 9.6 | 1.4 |
| Evaluation of conductive particle | Thickness of conductive portion (μm) | 0.15 | 0.15 | 0.15 |
|  | 10% K value (C) (N/mm$^2$) | 5810 | 5000 | 6030 |
|  | 10% K value (D) (N/mm$^2$) | 6040 | 6880 | 6640 |
|  | Absolute value (N/mm$^2$) of difference between 10% K value (C) and 10% K value (D) | 230 | 1880 | 610 |
|  | Compression recovery rate (%) | 24 | 25 | 14 |
|  | Adhesion between resin particle and conductive portion | ○○ | ○○ | ○○ |
|  | Shape preserving characteristics | ○ | ○○○ | ○○ |
| Evaluation of connection structure | Connection reliability | ○ | ○○○ | ○○ |
|  | Impact resistance | ○ | ○ | ○ |
|  | Connection reliability (after high-temperature and high-humidity | ○ | ○○ | ○○ |

TABLE 2

|  |  | Example 4 | Example 5 | Example 6 |
|---|---|---|---|---|
| Material of resin particle | Main agent A: type of epoxy monomer | Glycidylamine type epoxy resin (JER-630) | Alicyclic glycidylamine type epoxy resin (TETRAD-C) | 2,2-bis (4-glycidyloxyphenyl)propane |
|  | Content of main agent A [part(s) by weight] | 15 | 15 | 15 |
|  | Type of dispersion stabilizer | Polyvinylpyrrolidone | Polyvinylpyrrolidone | Polyvinylpyrrolidone |
|  | Content of disperion stabilizer [part(s) by weight] | 7.5 | 7.5 | 7.5 |
|  | Type of reaction solvent 1 | Ethanol | Isopropyl alcohol | Ethanol |
|  | Content of reaction solvent 1 | 250 | 250 | 250 |
|  | Main agent B: type of diamine monomer | 4,4'-diaminodiphenylmethane | 4,4'-diaminodiphenylmethane | 4,4'-diaminodiphenylmethane |
|  | Content of main agent B [part(s) by weight] | 7.63 | 7.44 | 4.37 |
|  | Type of reaction solvent 2 | Ethanol | Isopropyl alcohol | Ethanol |
|  | Content of reaction solvent 2 [part(s) by weight] | 35 | 35 | 35 |
|  | Other particles | — | — | — |
| Configuration of conductive particle | Ni core substance | Absence (A) | A | P |
|  | Insulating particle | A | A | A |
| Evaluation of resin particle | Presence or absence of exothermic peak | Presence (P) | P | P |
|  | Peak temperature (° C.) at exothermic peak having largest peak area | 300 | 250 | 330 |

TABLE 2-continued

|  |  | Example 4 | Example 5 | Example 6 |
|---|---|---|---|---|
|  | Exothermic amount (mJ/mg) at exothermic peak having largest peak area | 18000 | 13000 | 17000 |
|  | Presence or absence of endothermic peak | A | A | A |
|  | 10% K value (A) (N/mm$^2$) | 2520 | 1120 | 2010 |
|  | 10% K value (B) (N/mm$^2$) | 3780 | 2860 | 2240 |
|  | Absolute value (N/mm$^2$) of difference between 10% K value (A) and 10% K value (B) | 1260 | 1740 | 230 |
|  | Compression recovery rate (%) | 18 | 21 | 22 |
|  | Particle diameter (μm) | 6.9 | 7.6 | 7.0 |
|  | CV value (%) | 13.8 | 10.1 | 10.6 |
| Evaluation of conductive particle | Thickness of conductive portion (μm) | 0.15 | 0.15 | 0.22 |
|  | 10% K value (C) (N/mm$^2$) | 6320 | 4920 | 5810 |
|  | 10% K value (D) (N/mm$^2$) | 7580 | 6660 | 6040 |
|  | Absolute value (N/mm$^2$) of difference between 10% K value (C) and 10% K value (D) | 1260 | 1740 | 230 |
|  | Compression recovery rate (%) | 20 | 23 | 24 |
|  | Adhesion between resin particle and conductive portion | ○○ | ○○ | ○○ |
|  | Shape preserving characteristics | ○○○ | ○○ | ○ |
| Evaluation of connection structure | Connection reliability | ○○○ | ○○ | ○○ |
|  | Impact resistance | ○ | ○ | ○ |
|  | Connection reliability (after high-temperature and high-humidity) | ○○ | ○○ | ○○ |

TABLE 3

|  |  | Example 7 | Example 11 | Example 12 | Comparative Example 1 |
|---|---|---|---|---|---|
| Material of resin particle | Main agent A: type of epoxy monomer | 2,2-bis(4-glycidyloxyphenyl) propane | 2,2-bis(4-glycidyloxyphenyl) propane | 2,2-bis(4-glycidyloxyphenyl) propane | — |
|  | Content of main agent A [part(s) by weight] | 15 | 15 | 15 | — |
|  | Type of dispersion stabilizer | Polyvinylpyrrolidone | Polyvinylpyrrolidone | Polyvinylpyrrolidone | — |
|  | Content of disperion stabilizer [part(s) by weight] | 7.5 | 7.5 | 7.5 | — |
|  | Type of reaction solvent 1 | Ethanol | Ethanol | Ethanol | — |
|  | Content of reaction solvent 1 | 250 | 250 | 250 | — |
|  | Main agent B: type of diamine monomer | 4,4'-diaminodiphenylmethane | 1,4'-phenylenediamine | 2,2-bis[4-(4-aminophenoxy) phenyl] propane | — |
|  | Content of main agent B [part(s) by weight] | 4.37 | 2.34 | 8.90 | — |
|  | Type of reaction solvent 2 | Ethanol | Isopropyl alcohol | Ethanol | — |
|  | Content of reaction solvent 2 [part(s) by weight] | 35 | 35 | 35 | — |
|  | Other particles | — | — | — | Optobead 3500M |
| Configuration of conductive particle | Ni core substance | Presence (P) | A | A | A |
|  | Insulating particle | P | A | A | A |
| Evaluation of resin particle | Presence or absence of exothermic peak | P | P | P | A |
|  | Peak temperature (° C.) at exothermic peak having largest peak area | 330 | 330 | 330 | — |
|  | Exothermic amount (mJ/mg) at exothermic peak having largest peak area | 17000 | 17000 | 17000 | — |
|  | Presence or absence of endothermic peak | Absence (A) | A | A | A |
|  | 10% K value (A) (N/mm$^2$) | 2010 | 1690 | 1970 | 8580 |
|  | 10% K value (B) (N/mm$^2$) | 2240 | 1940 | 2210 | 8610 |
|  | Absolute value (N/mm$^2$) of difference between 10% K value (A) and 10% K value (B) | 230 | 250 | 240 | 30 |
|  | Compression recovery rate (%) | 22 | 17 | 12 | 52 |
|  | Particle diameter (μm) | 7.0 | 9.1 | 9.5 | 3.9 |
|  | CV value (%) | 10.6 | 5.1 | 5.3 | 1.6 |
| Evaluation of conductive particle | Thickness of conductive portion (μm) | 0.22 | 0.15 | 0.15 | 0.15 |
|  | 10% K value (C) (N/mm$^2$) | 5810 | 5490 | 5770 | 12230 |
|  | 10% K value (D) (N/mm$^2$) | 6040 | 5740 | 6010 | 12260 |

TABLE 3-continued

|  |  | Example 7 | Example 11 | Example 12 | Comparative Example 1 |
|---|---|---|---|---|---|
|  | Absolute value (N/mm$^2$) of difference between 10% K value (C) and 10% K value (D) | 230 | 250 | 240 | 30 |
|  | Compression recovery rate (%) | 24 | 20 | 16 | 54 |
|  | Adhesion between resin particle and conductive portion | ○○ | ○○ | ○○ | ○ |
|  | Shape preserving characteristics | ○ | ○ | ○ | X |
| Evaluation of connection structure | Connection reliability | ○ | ○ | ○ | X |
|  | Impact resistance | ○ | ○ | ○ | Δ |
|  | Connection reliability (after high-temperature and high-humidity | ○ | ○ | ○ | X |

TABLE 4

|  |  | Example 8 | Example 9 | Example 10 |
|---|---|---|---|---|
| Mixed solution component | Type of seed particle | Polystyrene particle | Polystyrene particle | Polystyrene particle |
|  | Content of seed particle [part(s) by weight] | 3.9 | 3.9 | 3.9 |
|  | Type of reaction solvent 1 | Ion-exchanged water | Ion-exchanged water | Ion-exchanged water |
|  | Content of reaction solvent 1 [part(s) by weight] | 500 | 500 | 500 |
|  | Type of material 1 | 5 wt % polyvinyl aqueous solution | 5 wt % polyvinyl aqueous solution | 5 wt % polyvinyl aqueous solution |
|  | Content of material 1 [part(s) by weight] | 120 | 120 | 120 |
| Component 1 for preparing emulsion | Type of material 2 | Monomer component | Monomer component | Monomer component |
|  | Content of material 2 [part(s) by weight] | 150 | 150 | 150 |
|  | Type of material 3 | 2,2'-azobis (methyl isobutyrate) | 2,2'-azobis (methyl isobutyrate) | 2,2'-azobis (methyl isobutyrate) |
|  | Content of material 3 [part(s) by weight] | 2 | 2 | 2 |
|  | Type of material 4 | Benzoyl peroxide | Benzoyl peroxide | Benzoyl peroxide |
|  | Content of material 4 [part(s) by weight] | 2 | 2 | 2 |
|  | Type of material 5 | 2,2-bis(4,4-di-tertiary-butylperoxycyclohexyl) propane | 2,2-bis(4,4-di-tertiary-butylperoxycyclohexyl) propane | 2,2-bis(4,4-di-tertiary-butylperoxycyclohexyl) propane |
|  | Content of material 5 [part(s) by weight] | 4 | 4 | 4 |
| Comprising items of monomer component | Type of material 6 | 1,6-hexanediol dimethacrylate | Hexylethyl methacrylate | 1,3-butylene glycol dimethacrylate |
|  | Content of material 6 [part(s) by weight] | 30 | 75 | 150 |
|  | Type of material 7 | Stylene | Glycidyl methacrylate | — |
|  | Content of material 7 [part(s) by weight] | 120 | 75 | — |
| Component 2 for preparing emulsion | Type of material 8 | Triethanolamine lauryl sulfate | Triethanolamine lauryl sulfate | Triethanolamine lauryl sulfate |
|  | Content of material 8 [part(s) by weight] | 9 | 9 | 9 |
|  | Type of reaction solvent 2 | Ethanol | Ethanol | Ethanol |
|  | Content of reaction solvent 2 [part(s) by weight] | 30 | 30 | 30 |
|  | Type of reaction solvent 3 | Ion-exchanged water | Ion-exchanged water | Ion-exchanged water |
|  | Content of reaction solvent 3 [part(s) by weight] | 1100 | 1100 | 1100 |
| Evaluation of resin particle | Presence or absence of exothermic peak | Presence (P) | P | P |
|  | Peak temperature (° C.) at exothermic peak having largest peak area | 180 | 130 | 220 |
|  | Exothermic amount (mJ/mg) at exothermic peak having largest peak area | 1400 | 1200 | 9000 |
|  | Presence or absence of endothermic peak | Absence (A) | A | A |
|  | 10% K value (A) (N/mm$^2$) | 1340 | 1120 | 2180 |
|  | 10% K value (B) (N/mm$^2$) | 1550 | 1200 | 2340 |
|  | Absolute value (N/mm$^2$) of difference between 10% K value (A) and 10% K value (B) | 210 | 80 | 160 |

TABLE 4-continued

|  |  | Example 8 | Example 9 | Example 10 |
|---|---|---|---|---|
|  | Compression recovery rate (%) | 18 | 10 | 36 |
|  | Particle diameter (μm) | 4.8 | 5.1 | 5.6 |
|  | CV value (%) | 1.6 | 3.6 | 1.8 |
| Evaluation of conductive particle | Thickness of conductive portion (μm) | 0.15 | 0.15 | 0.15 |
|  | 10% K value (C) (N/mm$^2$) | 4990 | 4770 | 5830 |
|  | 10% K value (D) (N/mm$^2$) | 5200 | 4850 | 5990 |
|  | Absolute value (N/mm$^2$) of difference between 10% K value (C) and 10% K value (D) | 210 | 80 | 160 |
|  | Compression recovery rate (%) | 20 | 12 | 38 |
|  | Adhesion between resin particle and conductive portion | ○ | ○ | ○ |
|  | Shape preserving characteristics | Δ | Δ | Δ |
| Evaluation of connection structure | Connection reliability | Δ | Δ | Δ |
|  | Impact resistance | ○ | Δ | Δ |
|  | Connection reliability (after high-temperature and high-humidity) | Δ | ○ | ○ |

TABLE 5

|  |  | Example 13 |
|---|---|---|
| Base material core resin particle | Type of core particle | Micropearl SP 210 |
|  | Content of core particle [part(s) by weight] | 50 |
|  | Type of reaction solvent 1 | Water |
|  | Content of reaction solvent 1 [part(s) by weight] | 500 |
|  | Type of material 1 | Polyallylamine |
|  | Content of material 1 [part(s) by weight] | 125 |
| Material of shell | Main agent A: type of epoxy monomer | 2,2-bis(4-glycidyloxyphenyl)propane |
|  | Content of main agent A [part(s) by weight] | 23 |
|  | Main agent B: type of diamine monomer | 2,2-bis[4-(4-aminophenoxy)phenyl]propane |
|  | Content of main agent B [part(s) by weight] | 13.5 |
|  | Type of dispersion stabilizer | Polyvinylpyrrolidone |
|  | Content of dispersion stabilizer [part(s) by weight] | 6.8 |
|  | Type of reaction solvent 2 | Ethanol |
|  | Content of reaction solvent 2 [part(s) by weight] | 250 |
| Evaluation of resin particle | Presence or absence of exothermic peak | Presence |
|  | Peak temperature (° C.) at exothermic peak having largest peak area | 330 |
|  | Exothermic amount (mJ/mg) at exothermic peak having largest peak area | 10000 |
|  | Presence or absence of endothermic peak | Absence |
|  | 10% K value (A) (N/mm$^2$) | 3890 |
|  | 10% K value (B) (N/mm$^2$) | 3420 |
|  | Absolute value (N/mm$^2$) of difference between 10% K value (A) and 10% K value (B) | 470 |
|  | Compression recovery rate (%) | 48 |
|  | Particle diameter (μm) | 11.0 |
|  | CV value (%) | 3.1 |
| Evaluation of conductive particle | Thickness of conductive portion (μm) | 0.22 |
|  | 10% K value (C) (N/mm$^2$) | 7690 |
|  | 10% K value (D) (N/mm$^2$) | 7220 |
|  | Absolute value (N/mm$^2$) of difference between 10% K value (C) and 10% K value (D) | 470 |
|  | Compression recovery rate (%) | 50 |
|  | Adhesion between resin particle and conductive portion | ○○ |
|  | Shape preserving characteristics | ○ |
| Evaluation of connection structure | Connection reliability | ○ |
|  | Impact resistance | ○ |
|  | Connection reliability (after high-temperature and high-humidity) | ○ |

(13) Example of Use as Gap Control Spacer

Preparation of Joint Material for Ceramic Package:

In Examples 1 to 13, a joint material for a ceramic package containing 30 parts by weight of the obtained resin particles and 70 parts by weight of glass (composition: Ag—V—Te—W—P—W—Ba—O, melting point: 264° C.) was obtained.

Production of Electronic Component Device:

The electronic component device shown in FIG. 5 was produced using the obtained joint material. Specifically, the joint material was applied to the outer peripheral portion of the first ceramic member by a screen printing method. Thereafter, the second ceramic member was placed to face, and the joint portion was irradiated with a semiconductor laser and fired to join the first ceramic member and the second ceramic member.

In the obtained electronic component device, an interval between the first ceramic member and the second ceramic member was well regulated. In addition, the obtained electronic component device operated well. In addition, airtightness inside the package was well maintained.

EXPLANATION OF SYMBOLS

1: Conductive particle
2: Conductive portion
11: Resin particle
21: Conductive particle
22: Conductive portion
22A: First conductive portion
22B: Second conductive portion
31: Conductive particle
31a: Protrusion
32: Conductive portion
32a: Protrusion
33: Core substance
34: Insulating substance
41: Connection structure
42: First connection object member
42a: First electrode
43: Second connection object member
43a: Second electrode
44: Joint portion
81: Electronic component device
82: First ceramic member
83: Second ceramic member
84: Bonded portion
84B: Glass
85: Electronic component
86: lead frame
R: Internal space

The invention claimed is:

1. A resin particle having an exothermic peak observed, where differential scanning calorimetry is performed by heating the resin particle at a temperature rising rate of 5° C./min from 100° C. to 350° C. in an air atmosphere, wherein the resin particle satisfies at least one configuration selected from the group consisting of a Configuration (1) and a Configuration (2), as follows:

Configuration (1): among the exothermic peaks, an exothermic amount at the exothermic peak having the largest peak area is 2,000 mJ/mg or more and 25,000 mJ/mg or less;

Configuration (2): an absolute value of a difference between a compressive elasticity modulus where the resin particle is compressed by 10% and the compressive elasticity modulus where the resin particle heated at 200° C. for 10 minutes is compressed by 10% is 180 N/mm$^2$ or more.

2. The resin particle according to claim 1, wherein the resin particle satisfies the Configuration (1).

3. The resin particle according to claim 1, wherein the resin particle satisfies the Configuration (2).

4. The resin particle according to claim 1, being used for a spacer, used for an adhesive for an electronic component, used to obtain a conductive particle having a conductive portion, or used for an additive manufacturing material.

5. The resin particle according to claim 1, being used as a spacer or used to obtain the conductive particle having the conductive portion by forming the conductive portion on a surface thereof.

6. A conductive particle comprising:
the resin particle according to claim 1; and
a conductive portion disposed on the surface of the resin particle.

7. The conductive particle according to claim 6, wherein an absolute value of a difference between a compressive elasticity modulus where the conductive particle is compressed by 10% and a compressive elasticity modulus where the conductive particle heated at 200° C. for 10 minutes is compressed by 10% is 180 N/mm$^2$ or more.

8. The conductive particle according to claim 6, further comprising an insulating substance disposed on an outer surface of the conductive portion.

9. The conductive particle according to claim 6, having a protrusion on the outer surface of the conductive portion.

10. A conductive material comprising:
a conductive particle; and
a binder resin,
the conductive particle comprising the resin particle according to claim 1 and a conductive portion disposed on a surface of the resin particle.

11. A connection structure comprising:
a first connection object member having a first electrode on a surface;
a second connection object member having a second electrode on a surface; and
a connection portion connecting the first connection object member and the second connection object member,
the connection portion being formed of a conductive particle or a conductive material containing the conductive particle and a binder resin,
the conductive particle comprising the resin particle according to claim 1 and a conductive portion disposed on a surface of the resin particle, and
the first electrode and the second electrode being electrically connected by the conductive particle.

* * * * *